(12) United States Patent
Raghavan et al.

(10) Patent No.: US 12,184,357 B2
(45) Date of Patent: Dec. 31, 2024

(54) METHODS FOR SELECTION OF ANTENNA ARRAYS AND BEAMFORMING FEEDBACK

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/745,095

(22) Filed: May 16, 2022

(65) Prior Publication Data

US 2023/0370123 A1    Nov. 16, 2023

(51) Int. Cl.
*H04B 7/02* (2018.01)
*H04B 7/0404* (2017.01)
*H04B 7/06* (2006.01)

(52) U.S. Cl.
CPC ......... *H04B 7/0404* (2013.01); *H04B 7/0608* (2013.01)

(58) Field of Classification Search
CPC .................. H04B 7/0404; H04B 7/0608

USPC ................ 375/267, 260, 259, 295, 219, 316
See application file for complete search history.

(56) References Cited

U.S. PATENT DOCUMENTS

2020/0178134 A1*  6/2020  Yang ..................... H04W 24/04
2022/0158711 A1*  5/2022  Ali ....................... H04B 7/0608

* cited by examiner

*Primary Examiner* — Zewdu A Kassa
(74) *Attorney, Agent, or Firm* — Holland & Hart LLP

(57) ABSTRACT

Methods, systems, and devices for wireless communications are described. Methods, systems, and devices for wireless communications are described. Some wireless communications systems may support methods for selection of antenna arrays and beamforming feedback. In some cases, a user equipment (UE) may monitor for an antenna blockage condition at the UE and may select a set of antenna arrays for the UE for communications between the UE and a network entity based at least in part on whether the antenna blockage condition is detected, the set of antenna arrays selected from a multiple predetermined sets of antenna arrays of the UE. Additionally, the UE may transmit, to the network entity, a message indicative of whether the antenna blockage condition is detected and may communicate with the network entity using the set of antenna arrays in accordance with whether the antenna blockage condition is detected.

30 Claims, 14 Drawing Sheets

METHODS FOR SELECTION OF ANTENNA ARRAYS AND BEAMFORMING FEEDBACK

FIELD OF TECHNOLOGY

The following relates to wireless communications, including methods for selection of antenna arrays and beamforming feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support selection of antenna arrays and providing beamforming feedback. Generally, the techniques described herein may enable a user equipment (UE) to select a set of antenna arrays based on whether an antenna blockage condition is detected at the UE and to transmit, to a network entity, a message indicative of whether the antenna blockage condition was detected. For example, a UE may monitor for an antenna blockage condition at the UE and may select a set of one or more antenna arrays of the UE for communications between the UE and a network entity based on whether the antenna blockage condition was detected. Additionally, the UE may select the set of one or more antenna arrays from multiple predetermined sets of antenna arrays. For example, the UE may select a first set of one or more antenna arrays based on the antenna blockage condition being detected, where the first set of one or more antenna arrays includes two antenna arrays that collectively cover portions of an edge and a face (back face) of the UE. In another example, the UE may select a second set of one or more antenna arrays based on the antenna blockage condition not being detected, where the second set of one or more antenna arrays includes two antenna arrays that each cover portions of opposite edges of the UE. Additionally, the UE may transmit, to the network entity, a message indicative of whether the antenna blockage condition is detected and may communicate with the network entity using the selected set of one or more antenna arrays in accordance with whether the antenna blockage condition is detected.

A method for wireless communications at a UE is described. The method may include monitoring for an antenna blockage condition at the UE, selecting a set of one or more antenna arrays of the UE for communications between the UE and a network entity, the set of one or more antenna arrays selected from a set of multiple predetermined sets of antenna arrays of the UE based on whether the antenna blockage condition is detected, transmitting, to the network entity, a message indicative of whether the antenna blockage condition is detected, and communicating with the network entity using the set of one or more antenna arrays in accordance with whether the antenna blockage condition is detected.

An apparatus for wireless communications at a UE is described. The apparatus may include a processor, memory coupled with the processor, and instructions stored in the memory. The instructions may be executable by the processor to cause the apparatus to monitor for an antenna blockage condition at the UE, select a set of one or more antenna arrays of the UE for communications between the UE and a network entity, the set of one or more antenna arrays selected from a set of multiple predetermined sets of antenna arrays of the UE based on whether the antenna blockage condition is detected, transmit, to the network entity, a message indicative of whether the antenna blockage condition is detected, and communicate with the network entity using the set of one or more antenna arrays in accordance with whether the antenna blockage condition is detected.

Another apparatus for wireless communications at a UE is described. The apparatus may include means for monitoring for an antenna blockage condition at the UE, means for selecting a set of one or more antenna arrays of the UE for communications between the UE and a network entity, the set of one or more antenna arrays selected from a set of multiple predetermined sets of antenna arrays of the UE based on whether the antenna blockage condition is detected, means for transmitting, to the network entity, a message indicative of whether the antenna blockage condition is detected, and means for communicating with the network entity using the set of one or more antenna arrays in accordance with whether the antenna blockage condition is detected.

A non-transitory computer-readable medium storing code for wireless communications at a UE is described. The code may include instructions executable by a processor to monitor for an antenna blockage condition at the UE, select a set of one or more antenna arrays of the UE for communications between the UE and a network entity, the set of one or more antenna arrays selected from a set of multiple predetermined sets of antenna arrays of the UE based on whether the antenna blockage condition is detected, transmit, to the network entity, a message indicative of whether the antenna blockage condition is detected, and communicate with the network entity using the set of one or more antenna arrays in accordance with whether the antenna blockage condition is detected.

In some examples of the method, apparatuses, and non-transitory computer-readable medium described herein, selecting the set of one or more antenna arrays of the UE may include operations, features, means, or instructions for selecting a first set of one or more antenna arrays of the UE based on the antenna blockage condition being detected, where the first set of one or more antenna arrays includes two antenna arrays that collectively cover portions of an edge and a face of the UE.

In some examples of the method, apparatuses, and non-transitory computer-readable medium described herein, the two antenna arrays form an L-shaped module proximal to the edge and the face of the UE.

In some examples of the method, apparatuses, and non-transitory computer-readable medium described herein, selecting the set of one or more antenna arrays of the UE may include operations, features, means, or instructions for selecting a first set of one or more antenna arrays of the UE based on the antenna blockage condition not being detected, where the first set of one or more antenna arrays includes two antenna arrays that each cover portions of opposite edges of the UE.

In some examples of the method, apparatuses, and non-transitory computer-readable medium described herein, monitoring for the antenna blockage condition may include operations, features, means, or instructions for sensing, via frequency-modulated continuous-wave (FMCW) radar or via another sensing mechanism, for a physical blockage that may be proximal to the UE.

In some examples of the method, apparatuses, and non-transitory computer-readable medium described herein, transmitting the message that may be indicative of whether the antenna blockage condition may be detected may include operations, features, means, or instructions for transmitting an indication of the set of one or more antenna arrays selected based on whether the antenna blockage condition may be detected.

In some examples of the method, apparatuses, and non-transitory computer-readable medium described herein, transmitting the message that may be indicative of whether the antenna blockage condition may be detected may include operations, features, means, or instructions for transmitting an indication of one or more transmission configuration indicator (TCI) states associated with communications between the network entity and the UE via the set of one or more antenna arrays.

In some examples of the method, apparatuses, and non-transitory computer-readable medium described herein, monitoring for the antenna blockage condition at the UE may include operations, features, means, or instructions for monitoring for satisfaction of a proximity threshold with respect to at least one antenna array of the UE.

In some examples of the method, apparatuses, and non-transitory computer-readable medium described herein, the antenna blockage condition may be based on a proximity of a hand, a finger, or both, of a user of the UE satisfying a proximity threshold.

In some examples of the method, apparatuses, and non-transitory computer-readable medium described herein, the antenna blockage condition may be associated with spherical coverage.

In some examples of the method, apparatuses, and non-transitory computer-readable medium described herein, the predetermined sets of antenna arrays of the UE include a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

A method for wireless communications at a network entity is described. The method may include receiving a message indicative of whether an antenna blockage condition is detected at a UE that includes a set of multiple antenna arrays, selecting a set of one or more communication parameters for communications between the UE and the network entity based on receiving the message, the set of one or more communication parameters selected from a set of multiple sets of communication parameters that each correspond to communications with the UE via respective predetermined sets of antenna arrays of the UE, and communicating with the UE in accordance with the set of one or more communication parameters.

An apparatus for wireless communications at a network entity is described. The apparatus may include a processor, memory coupled with the processor, and instructions stored in the memory. The instructions may be executable by the processor to cause the apparatus to receive a message indicative of whether an antenna blockage condition is detected at a UE that includes a set of multiple antenna arrays, select a set of one or more communication parameters for communications between the UE and the network entity based on receiving the message, the set of one or more communication parameters selected from a set of multiple sets of communication parameters that each correspond to communications with the UE via respective predetermined sets of antenna arrays of the UE, and communicate with the UE in accordance with the set of one or more communication parameters.

Another apparatus for wireless communications at a network entity is described. The apparatus may include means for receiving a message indicative of whether an antenna blockage condition is detected at a UE that includes a set of multiple antenna arrays, means for selecting a set of one or more communication parameters for communications between the UE and the network entity based on receiving the message, the set of one or more communication parameters selected from a set of multiple sets of communication parameters that each correspond to communications with the UE via respective predetermined sets of antenna arrays of the UE, and means for communicating with the UE in accordance with the set of one or more communication parameters.

A non-transitory computer-readable medium storing code for wireless communications at a network entity is described. The code may include instructions executable by a processor to receive a message indicative of whether an antenna blockage condition is detected at a UE that includes a set of multiple antenna arrays, select a set of one or more communication parameters for communications between the UE and the network entity based on receiving the message, the set of one or more communication parameters selected from a set of multiple sets of communication parameters that each correspond to communications with the UE via respective predetermined sets of antenna arrays of the UE, and communicate with the UE in accordance with the set of one or more communication parameters.

In some examples of the method, apparatuses, and non-transitory computer-readable medium described herein, receiving the message that may be indicative of whether the antenna blockage condition may be detected may include operations, features, means, or instructions for receiving an indication of a set of one or more antenna arrays selected by the UE from the respective predetermined sets of antenna arrays.

In some examples of the method, apparatuses, and non-transitory computer-readable medium described herein, receiving the message that may be indicative of whether the antenna blockage condition may be detected may include operations, features, means, or instructions for receiving an indication of one or more TCI states associated with communications between the network entity and the UE via a set of one or more antenna arrays selected by the UE from the respective predetermined sets of antenna arrays.

In some examples of the method, apparatuses, and non-transitory computer-readable medium described herein, the antenna blockage condition may be based on a proximity of a hand, a finger, or both, of a user of the UE satisfying a proximity threshold.

In some examples of the method, apparatuses, and non-transitory computer-readable medium described herein, the antenna blockage condition may be associated with spherical coverage.

In some examples of the method, apparatuses, and non-transitory computer-readable medium described herein, the predetermined sets of antenna arrays of the UE include a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

DETAILED DESCRIPTION

Some wireless communications systems may support wireless devices, such as a user equipment (UE), capable of communicating using a set of one or more antenna arrays, which may be referred to as an antenna array configuration. In some cases, the UE may support multiple antenna array configurations. For example, the UE may support a first antenna array configuration including two antenna arrays, where the antenna arrays are located on opposite long edges of the UE. In another example, the UE may support a second antenna array configuration including two antenna arrays, where the antenna arrays form an L-shaped module in which a first antenna array is located on a long edge of the UE and a second antenna array is located on the back face of the UE. In some cases, a UE may experience blockage of one or more antenna arrays used by the UE to communicate with a network entity, such as due to a user's hand, fingers, or other body parts, and may experience degraded communications due to the blockage.

Techniques described herein may support a UE selecting a set of one or more antenna arrays (e.g., an antenna array configuration) based on whether an antenna blockage condition is detected at the UE and transmitting, to a network entity, a message indicative of whether the antenna blockage condition is detected. For example, a UE may monitor for an antenna blockage at the UE, where the antenna blockage condition may be associated with blockage of one or more antenna arrays used by the UE to communicate with a network entity. In some cases, the UE may select a set of antenna arrays based on whether the antenna blockage condition is detected. For example, the UE may select a first set of antenna arrays based on detecting the antenna blockage condition (e.g., blockage is occurring) and may select a second set of antenna arrays based on detecting an absence of the antenna blockage condition (e.g., no blockage is occurring). In some cases, the UE may transmit a message indicative of whether the antenna blockage condition is detected. For example, the message may include an indication of the one or more antenna arrays selected by the UE, an indication of one or more transmission configuration indicator (TCI) states associated with the one or more antenna arrays selected by the UE, or both. Additionally, the UE may communicate with the network entity using the selected set of one or more antenna arrays in accordance with whether the antenna blockage condition is detected.

Aspects of the disclosure are initially described in the context of wireless communications systems. Aspects of the disclosure are then described in the context of antenna array configurations. Aspects of the disclosure are further illustrated by and described with reference to apparatus diagrams, system diagrams, and flowcharts that relate to methods for selection of antenna arrays and beamforming feedback.

Figure 1:
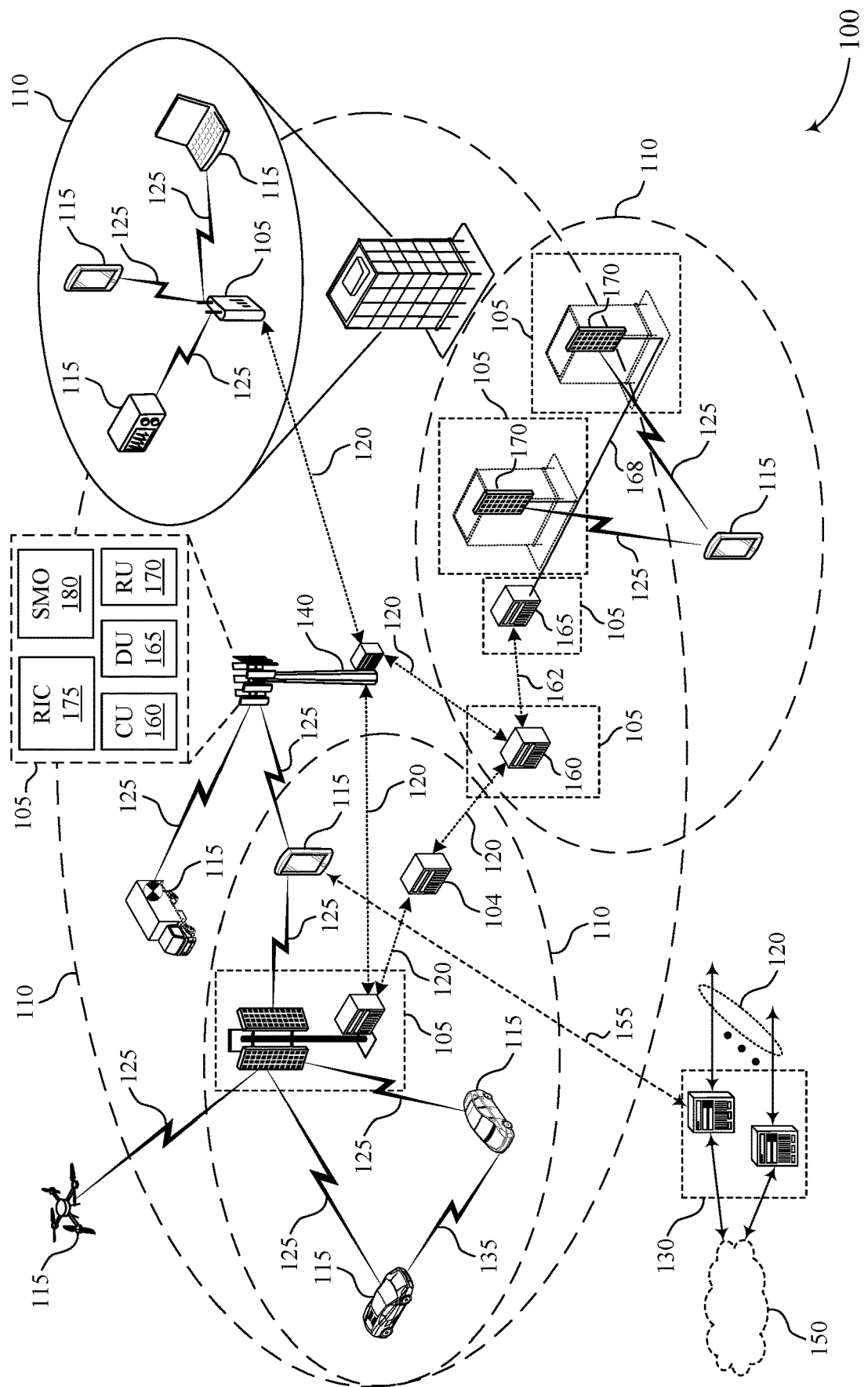
FIG. 1 illustrates an example of a wireless communications system that supports methods for selection of antenna arrays and beamforming feedback in accordance with one or more aspects of the present disclosure.

FIG. 1 illustrates an example of a wireless communications system 100 that supports methods for selection of antenna arrays and beamforming feedback in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support methods for selection of antenna arrays and beamforming feedback as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support selection of antenna arrays and beamforming feedback. In some cases, a UE 115 may monitor for an antenna blockage condition at the UE 115, where the antenna blockage condition may be associated with one or more antenna arrays at the UE 115 being blocked (e.g., by one or more fingers, a hand, or both, of a user associated with the UE 115), which may result in impacts to coverage (e.g., spherical coverage) of the UE 115. Additionally, the UE 115 may select a set of antenna arrays based on whether an antenna blockage condition is detected, where the set of one or more antenna arrays is selected from multiple predetermined sets of antenna arrays, which may be referred to as antenna array configurations. In some cases, each antenna array configuration may correspond to a mode associated with whether the antenna blockage condition is detected. For example, the UE 115 may select a first set of one or more antenna arrays, such as a first antenna array configuration, based on the antenna blockage condition being detected. That is, the first antenna array configuration may correspond to a "Blockage Mode" associated with the antenna blockage condition being detected. In another example, the UE 115 may select a second set of one or more antenna arrays, such as a second antenna array configuration, based on the antenna blockage condition not being detected (e.g., detecting an absence of the antenna blockage condition). That is, the second antenna array configuration may correspond to a "No Blockage Mode" associated with the antenna blockage condition not being detected.

In some cases, the UE 115 may transmit, to a network entity 105, a message indicate of whether the antenna blockage condition is detected. For example, the message may indicate the set of one or more antenna arrays selected by the UE 115. Additionally, or alternatively, the message may indicate a set of one or more communication parameters associated with the set of one or more antenna arrays selected by the UE 115. For example, the set of one or more communication parameters may include an indication of one or more TCI states associated with the set of one or more antenna arrays selected by the UE 115. In some cases, the UE 115 may communicate with the network entity 105 using the set of one or more antenna arrays in accordance with whether the antenna blockage condition is detected.

Figure 2:
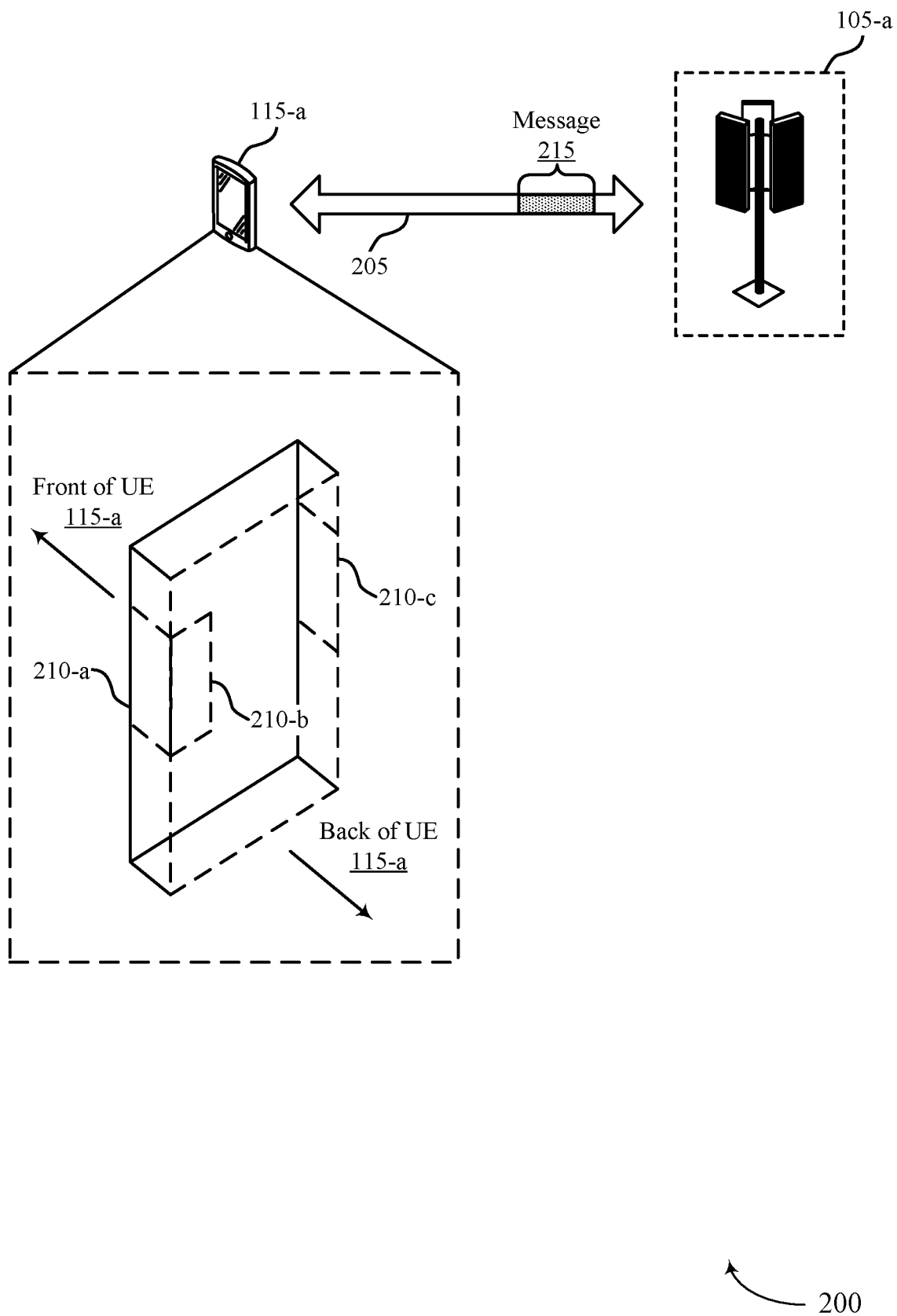
FIG. 2 illustrates an example of a wireless communications system that supports methods for selection of antenna arrays and beamforming feedback in accordance with one or more aspects of the present disclosure.

FIG. 2 illustrates an example of a wireless communications system 200 that supports methods for selection of antenna arrays and beamforming feedback in accordance with one or more aspects of the present disclosure. In some examples, the wireless communications system 200 may implement aspects of the wireless communications system 100. For example, the wireless communications system 200 may include one or more network entities 105 (e.g., a network entity 105-*a*) and one or more UEs 115 (e.g., a UE 115-*a*), which may be examples of the corresponding devices as described with reference to FIG. 1. In the example of FIG. 2, the network entities 105 may be examples of a CU 160, a DU 165, an RU 170, a base station 140, an IAB node 104, or one or more other network nodes as described with reference to FIG. 1. In some cases, the UE 115-*a* may transmit a message 215 to the network entity 105-*a* via a communication link 205 indicating whether an antenna blockage condition is detected.

Some wireless communications systems (e.g., millimeter wave (mmW) wireless communications systems) may support wireless devices, such as a UE 115, capable of communicating using one or more antenna modules (e.g., panels). For example, the UE 115 (e.g., a premium or high-tier UE 115) may support three antenna modules, where two antenna modules cover opposite edges of the UE 115 (e.g., long or side edges of the UE 115) and one antenna module covers an edge perpendicular to the opposite edges (e.g., a short or top edge of the UE 115). In some cases, each antenna module may include a set of antenna elements (e.g., antennas or antenna arrays) that may be co-phased in beamforming (e.g., which may bridge a link budget). That is, each antenna module may include one or more antenna arrays, where each antenna array includes a set of multiple connected antennas which function as a single antenna to transmit or receive signals. For example, an antenna module may include a 1×4 antenna array (e.g., dual-polarized antenna array) where the antenna array is made up of 4 antennas (e.g., arranged in a line) working together as a single antenna. In another example, an antenna module may include a 1×5 antenna array (e.g., dual-polarized antenna array) where the antenna array is made up of 5 antennas (e.g., arranged in a line) working together as a single antenna.

In some cases, a UE 115 may support (e.g., may have or may be designed with) antenna modules with a higher quantity of antenna elements (e.g., more than 5 antennas in an antenna array or more than 1 antenna array per antenna module). Additionally, or alternatively, the UE 115 may support a smaller quantity of antenna modules (e.g., less than 3 antenna modules) which may result in a decreased cost, a decreased complexity, a change in manufacturing (e.g., a reduced number of stock keeping units), or any combination thereof (e.g., for low end devices operating in mmW wireless communications systems). That is, the quantity of antenna elements supported by a UE 115 may result in changes in cost, complexity, or manufacturing.

Additionally, placement of one or more antenna modules may result in different beamforming capabilities, different performance trade-offs, or both (e.g., due to original equipment manufacturer (OEM) optimization). For example, a first UE 115 may support two antenna modules (e.g., a dual antenna module design) located on opposite long edges of the first UE 115, where each antenna module includes a 1×5 antenna array and each antenna module is associated with a radio frequency integrated circuit (RFIC) (e.g., Design 1). In such cases, the first UE 115 may support more capabilities (e.g., beamforming capabilities) than a second UE 115 that supports a single antenna module (e.g., a single antenna module design) located on a long edge of the second UE 115, where the single antenna module includes a 1×5 antenna array and is associated with an RFIC (e.g., Design 2). However, the dual antenna module design (e.g., a robust design) supported by the first UE 115 may be more expensive than the single antenna module design (e.g., the cheapest design) support by the second UE 115 (e.g., due to costs associated with the additional antenna module and RFIC).

In another example, a third UE 115 may support an L-shaped antenna module (e.g., Design 3), where the L-shaped antenna module includes a first 1×5 antenna array on a long edge of the third UE 115 (e.g., side mounted) and a second 1×5 antenna array on a face of the third UE 115 (e.g., back mounted) and both antenna arrays (e.g., the first antenna array and the second antenna array) are associated with a single RFIC (e.g., can be served with a single RFIC solution). The third UE 115 may support similar capabilities (e.g., features) as the first UE 115 (e.g., more capabilities than Design 1), however, the third UE 115 may be cheaper than the first UE 115 (e.g., due to reduced costs in terms of manufacturing). In another example, a fourth UE 115 may support an L-shaped antenna module on a first long edge of the fourth UE 115 (e.g., side and back mounted) and another antenna module on a second long edge of the UE 115 (e.g., Design 4), opposite the first long edge. Further, the L-shaped module may include two 1×5 antenna arrays served by a first RFIC and the additional antenna module (e.g., non-L-shaped antenna module) may include a 1×5 antenna array served by a second RFIC. The fourth UE 115 may support capabilities of the first UE 115, the second UE 115, and the third UE 115 (e.g., may carry features of Design 1, Design 2, and Design 3). Additionally, use of multiple antenna modules (e.g., each including one or more antenna arrays) may support spherical coverage (e.g., may support the ability to meet spherical coverage thresholds) with or without blockage (e.g., blockage caused by a hand or body part) and may support robustness with beam switching over one or more of the multiple antenna modules. However, in some cases, a UE may experience blockage of one or more antenna modules used by the UE to communicate with a network entity, such as due to a user's hand or fingers, which may result in degraded communications, communication inefficiencies, or failed communications.

As such, the wireless communications systems 200 may support methods for selection of antenna arrays and transmission of beamforming feedback. In some cases, a UE 115, such as a UE 115-*a*, may support multiple antenna modules (e.g., Design 4). For example, the UE 115 may support a first antenna module (e.g., an L-shaped antenna module) including an antenna array 210-*a* (e.g., located on a first long edge of the UE 115-*a*) and an antenna array 210-*b* (e.g., located on a back face of the UE 115-*a*) and a second antenna module including an antenna array 210-*c* (e.g., located on a second long edge of the UE 115-*a*, opposite the first long edge of the UE 115-*a*). In some cases, the UE 115-*a* may communicate with a network entity 105-*a* using a first antenna array configuration (e.g., associated with a no blockage mode), described with reference to FIG. 3A, including the antenna array 210-*a* and the antenna array 210-*c*. Additionally, the first antenna array configuration may be associated with a first set of communication parameters. For example, the UE 115-*a*, operating according to the first antenna array configuration, may communicate using a first beam pair. That is, the UE 115-*a* may transmit or receive signals from the antenna array 210-*a* via a first beam (e.g., according to a first TCI state) and may transmit or receive signals from the antenna array 210-*c* via a second beam (e.g., according to a second TCI state), where the first beam and the second beam are part of the first beam pair.

In some cases, the UE 115-*a* (e.g., operating according to the first antenna array configuration) may detect (e.g., sense) blockage at the UE 115-*a*, which may result in impacts to coverage of the UE 115-*a* (e.g., a reduction in spherical coverage of the UE 115-*a*). In some cases, the UE 115-*a* may detect blockage based on energy associated with signals from the antenna array 210-*a*, energy associated with signals from the antenna array 210-*c*, or both, being reflected (e.g., along an axis normal, or pointing outward, from the antenna array 210). Additionally, or alternatively, the UE 115-*a* may detect a physical blockage, such as blockage due to a finger of a user associated with the UE 115-*a*, a hand of the user associated with the UE 115-*a*, or both. For example, the UE 115-*a* may detect the physical blockage (e.g., presence or absence of a hand or finger(s)) via a frequency-modulated continuous-wave (FMCW) radar or via another sensing mechanism (e.g., based on lidar, cameras, or both). That is, the UE 115-*a* may monitor the FMCW radar, or other sensing mechanism, and detect when a proximity threshold with respect to at least one antenna array 210 of the UE 115-*a* is satisfied (e.g., the antenna blockage condition is based on a proximity of a hand, a finger, a body part, or any combination thereof, of a user of the UE 115-*a* satisfying a proximity threshold).

In some cases, the UE 115-*a* may switch antenna array configurations based on detecting blockage. In other words, the UE 115-*a* may dynamically select one or more antenna arrays 210 based on detecting blockage. For example, the UE 115-*a*, communicating via the first antenna array configuration may switch to communicating via a second antenna array configuration (e.g., associated with a blockage mode), described with reference to FIG. 3B, including the antenna array 210-*a* and the antenna array 210-*b* (e.g., the L-shaped antenna module). Additionally, the second antenna array configuration may be associated with a second set of communication parameters. For example, the UE 115-*a*, operating according to the second antenna array configuration, may communicate using a second beam pair. That is, the UE 115-*a* may transmit or receive signals from the antenna array 210-*a* via a third beam (e.g., according to a third TCI state) and may transmit or receive signals from the antenna array 210-*b* via a fourth beam (e.g., according to a fourth TCI state), where the third beam and the fourth beam are part of the second beam pair. In some cases, the first beam and the third beam may be the same beam.

In some cases, the UE 115-*a* may transmit, to the network entity 105-*a*, a message 215 indicating that blockage has been detected (e.g., indicating the UE is operating according to a blockage mode) based on the UE 115-*a* selecting the second antenna array configuration. In some cases, the message 215 may include an indication of the antenna arrays 210 selected by the UE 115-*a*. For example, the message 215 may include an indication that the UE 115-*a* is communicating via the antenna array 210-*a* and the antenna array 210-*b*. In another example, the message 215 may include an indication that the UE 115-*a* switched communications from the antenna array 210-*c* to the antenna array 210-*b*. Additionally, or alternatively, the message 215 may indicate the second set of communication parameters associated with the second antenna array configuration. In some cases, the set of communication parameters may include one or more TCI states. For example, the message 215 may include an indication of a first TCI state associated with the antenna array 210-*a*, a second TCI state associated with the antenna array 210-*b*, or both (e.g., TCI states may be grouped over 4-layers).

In some cases, signaling an indication of the selected antenna arrays 210 to the network entity 105-*a* may support beam pairing (e.g., in 4-layer transmissions, 2-layer polarization transmissions from each antenna array 210). For example, the UE 115-*a* and the network entity 105-*a* may communicate via a first set of beam pairs when the UE 115-*a* is communicating according to the first antenna array configuration (e.g., no blockage mode) and may communicate via a second set of beam pairs when the UE 115-*a* is communicating according to the second antenna array configuration (e.g., blockage mode). Additionally, signaling an indication of the selected antenna arrays 210 to the network entity 105-*a* may enable the network entity 105-*a* to determine power-performance trade-offs at the UE 115-*a* (e.g., diversity in terms of beam's main lobes, power consumption with the use of a single/two RFICs, associated thermal constraints, etc.).

In some cases, the UE 115-*a* may detect that blockage at the UE 115-*a* may be resolved (e.g., the UE 115-*a* may not detect antenna blockage). For example, an FMCW radar at the UE 115-*a* may detect that a hand of the user associated with the UE 115-*a* is no longer causing blockage (e.g., a proximity of a hand, a finger, or both, of the user of the UE fails to satisfy a proximity threshold). In such cases, the UE 115-*a* may switch from communicating via the second antenna array configuration to communicating via the first antenna array configuration (e.g., may dynamically select the first antenna array configuration). Additionally, the UE 115-*a* may switch from communicating according to the second set of communication parameters associated with the second antenna array configuration to communicating according to the first set of communication parameters associated with the first antenna array configuration. Further, the UE 115-*a* may transmit a second message 215 to the network entity 105-*a* indicating the antenna blockage is resolved (e.g., the UE 115-*a* is operating according to a no blockage antenna blockage condition).

While much of the present disclosure is described in the context of a UE 115 having a first antenna module, including two antenna arrays 210, and a second antenna module, including a single antenna array 210, this is not to be regarded as a limitation of the present disclosure. Indeed, it is contemplated herein that the UE 115 may select a set of antenna arrays from the antenna arrays 210, including the antenna array 210-*a*, the antenna array 210-*b*, and the antenna array 210-*c*. In this regard, any quantity of antenna array configurations (e.g., sets of antenna arrays), any quantity of antenna modules (e.g., in any shape), and any quantity of antenna arrays 210 may be considered with regards to the techniques described herein.

Figure 3A:
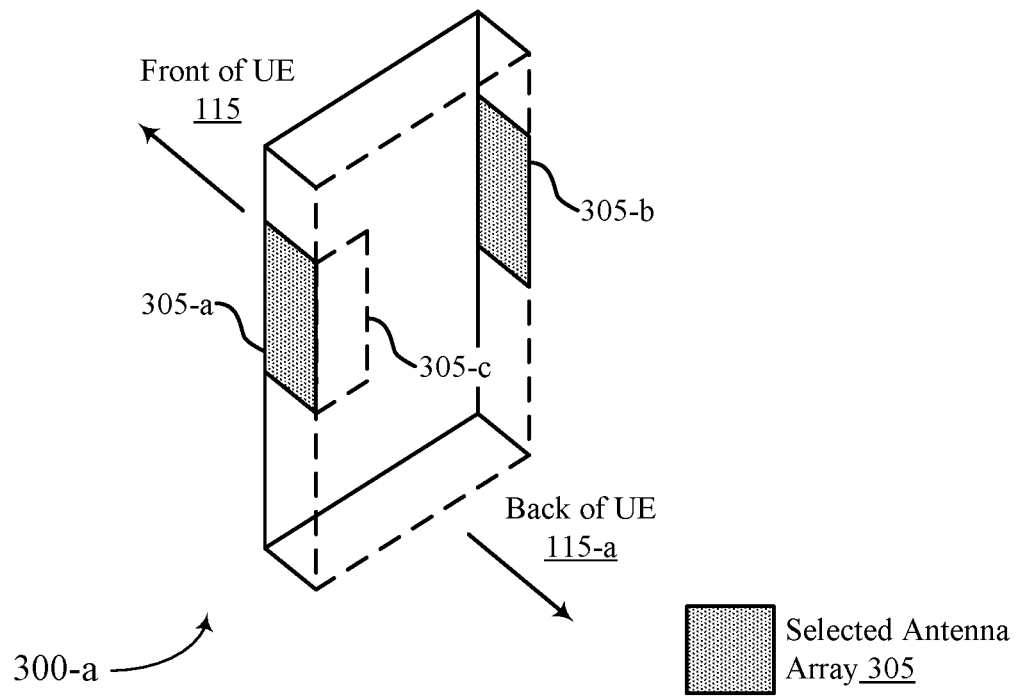
FIGS. 3A and 3B each illustrate an example of an antenna array configuration that supports methods for selection of antenna arrays and beamforming feedback in accordance with one or more aspects of the present disclosure.
Figure 3B:
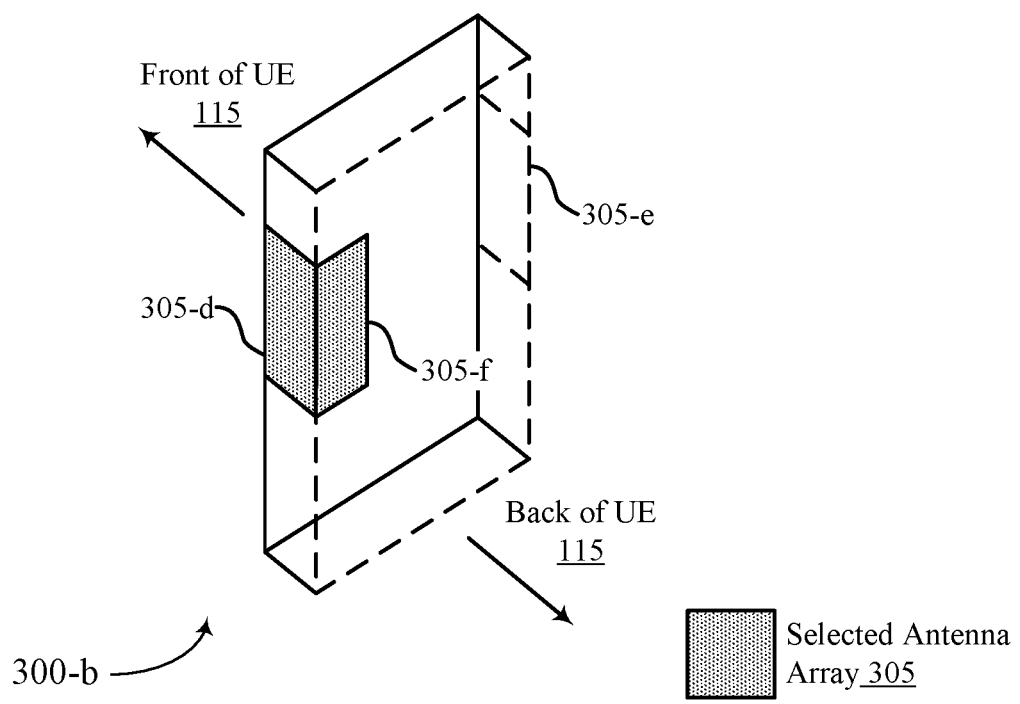

FIGS. 3A and 3B each illustrate an example of an antenna array configuration 300 that supports methods for selection of antenna arrays and beamforming feedback in accordance with one or more aspects of the present disclosure. In some examples, the antenna array configurations 300 may implement aspects of the wireless communications system 100 and the wireless communications system 200. For example, the antenna array configurations 300 may include one or more UEs 115, which may be examples of the corresponding devices as described with reference to FIG. 1. In some cases, a UE 115 may communicate via an antenna array configuration 300-*a* and switch to communicating via an antenna array configuration 300-*b* based on detecting whether an antenna blockage condition is detected.

In some cases, a UE 115 may monitor for an antenna blockage condition at the UE 115 and may select a set of one or more antenna arrays of the UE 115 for communications with a network entity 105 based on whether the antenna blockage condition is detected. Additionally, the set of one or more antenna arrays may be selected from multiple sets of predetermined antenna arrays, which may be referred to as antenna array configurations, such as the antenna array configurations 300. In some cases, a mode may be associated with whether the antenna blockage condition is detected, such that the UE 115 may select an antenna array configuration 300 based on a mode. In other words, an antenna array configuration 300 may correspond to a mode associated with whether an antenna blockage condition is detected.

For example, in FIG. 3A, a UE 115 may be associated with (e.g., may have) three antenna arrays 305, including an antenna array 305-*a*, an antenna array 305-*b*, and an antenna array 305-*c*. The UE 115 may monitor for an antenna blockage condition and may detect (e.g., sense) an absence of the antenna blockage condition at the UE 115 (e.g., no blockage is occurring). In other words, detecting an absence of the antenna blockage condition (e.g., not detecting the antenna blockage condition) may indicate that the UE 115 is not experiencing antenna blockage (e.g., a value associated with antenna blockage, such as a proximity of a physical blockage to one or more antenna arrays, is less than a threshold value, such as a threshold proximity value). Additionally, the absence of the antenna blockage condition may be associated with a "No Blockage Mode." In such cases, the UE 115 may select the antenna array 305-*a* and the antenna array 305-*b* (e.g., located on opposite long edges of the UE 115), which may be referred to as an antenna array configuration 300-*a*, for communicating with a network entity 105. That is, the antenna array configuration 300-*a*, including antenna array 305-*a* and the antenna array 305-*b*, may be associated with the "No Blockage Mode" (e.g., an antenna blockage condition corresponding to no blockage).

In some cases, the UE 115 may monitor for an antenna blockage condition and may detect (e.g., sense) the antenna blockage condition at the UE 115 (e.g., blockage is occurring). For example, in FIG. 3B, a UE 115 may be associated with (e.g., may have) three antenna arrays 305, including an antenna array 305-*d*, an antenna array 305-*e*, and an antenna array 305-*f*, and the UE 115 may detect the antenna blockage condition at the UE 115. In other words, detection of the antenna blockage condition may indicate that the UE 115 is experiencing antenna blockage (e.g., the value associated with antenna blockage, such as the proximity of a physical blockage to one or more antenna arrays, is greater than or equal to the threshold value). Additionally, the presence of the antenna blockage condition may be associated with a "Blockage Mode." In such cases, the UE 115 may select the antenna array 305-*d* and the antenna array 305-*f* (e.g., forming an L-shaped antenna module on a long edge of the UE 115 and a back face of the UE 115), which may be referred to as an antenna array configuration 300-*b*, for communicating with a network entity 105. That is, the antenna array configuration 300-*b*, including antenna array 305-*d* and the antenna array 305-*f*, may be associated with the "Blockage Mode" (e.g., an antenna blockage condition corresponding to blockage).

While much of the present disclosure is described in the context of an antenna array configuration 300-*a* and an antenna array configuration 300-*b*, this is not to be regarded as a limitation of the present disclosure. Indeed, it is contemplated herein that a UE 115 may select a set of one or more antenna arrays of the UE 115 from multiple sets of predetermined antenna arrays, including the antenna array configuration 300-*a* and the antenna array configuration 300-*b*. In this regard, any quantity of antenna array configurations 300, any quantity of antenna modules (e.g., in any shape), and any quantity of antenna arrays 305 may be considered with regards to the techniques described herein.

Figure 4:
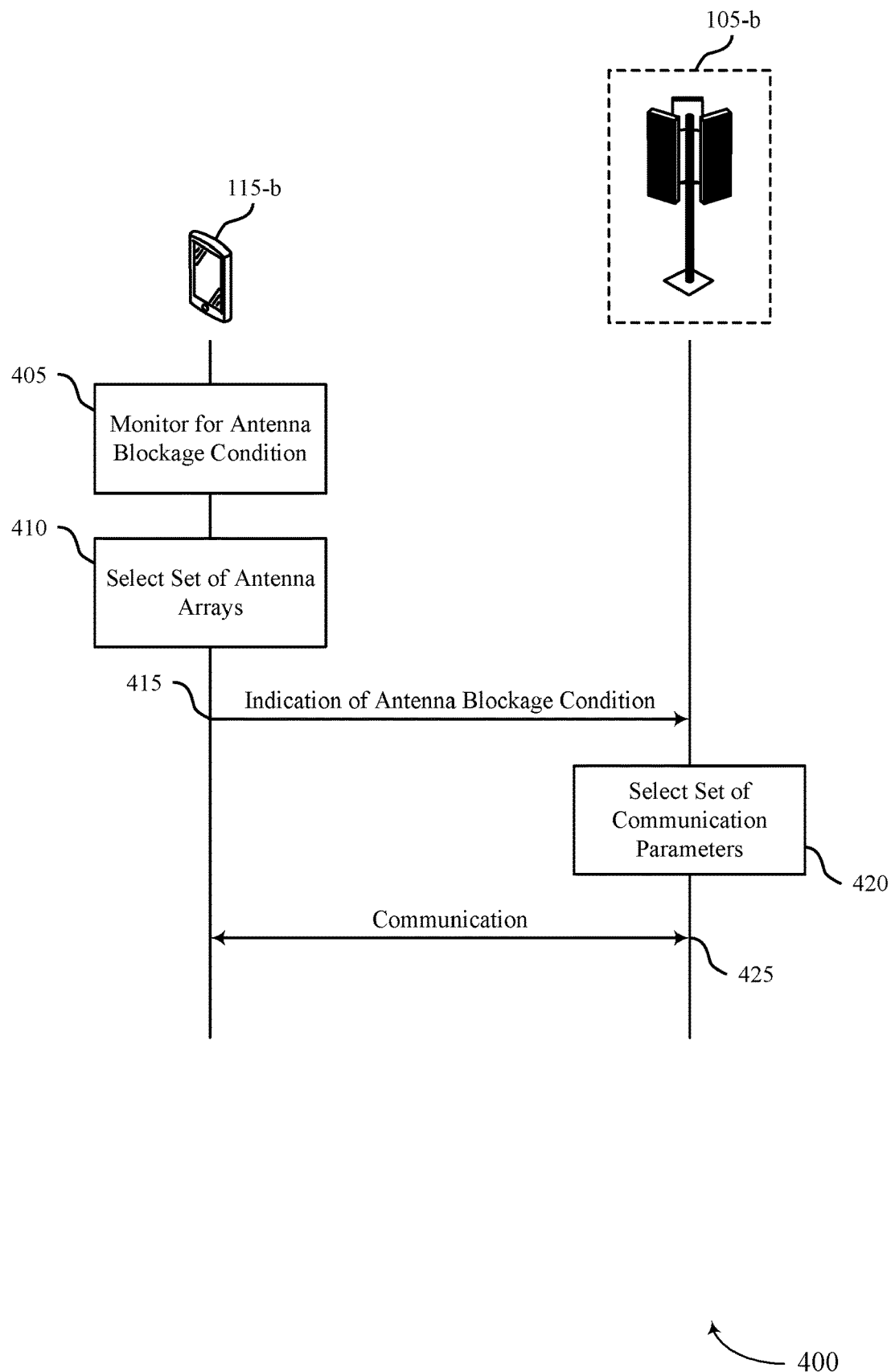
FIG. 4 illustrates an example of a process flow that supports methods for selection of antenna arrays and beamforming feedback in accordance with one or more aspects of the present disclosure.

FIG. 4 illustrates an example of a process flow 400 that supports methods for selection of antenna arrays and beamforming feedback in accordance with one or more aspects of the present disclosure. In some examples, the process flow 400 may implement aspects of the wireless communications system 100, the wireless communications system 200, and the antenna array configurations 300. For example, the process flow 400 may include one or more network entities 105 (e.g., a network entity 105-*b*) and one or more UEs 115 (e.g., a UE 115-*b*), which may be examples of the corresponding devices as described with reference to FIG. 1. In the example of FIG. 4, the network entities 105 may be examples of a CU 160, a DU 165, an RU 170, a base station 140, an IAB node 104, or one or more other network nodes as described with reference to FIG. 1. In some cases, the UE 115-*b* may communicate with the network entity 105-*b* using a set of one or more antenna arrays in accordance with whether an antenna blockage condition is detected.

At 405, the UE 115-*b* may monitor for an antenna blockage condition at the UE 115-*b*. In some cases, the UE 115-*b* may monitor for the antenna blockage condition by sensing, via a FMCW radar or via another sensing mechanism, for a physical blockage that is proximal to the UE 115-*b*. That is, the antenna blockage condition may be based on sensing a physical blockage that is proximal to the UE 115-*b*. For example, the UE 115-*b* may monitor for satisfaction of a proximity threshold with respect to at least one antenna array of the UE 115-*b*, where the detection of the antenna blockage condition is based at least in part on satisfaction of the proximity threshold. That is, the antenna blockage condition may be based on a proximity of a hand, a finger, or both, of a user of the UE 115-*b* satisfying the proximity threshold. In some cases, the antenna blockage condition may be associated with spherical coverage (e.g., spherical antenna blockage).

At 410, the UE 115-*b* may select a set of one or more antenna arrays of the UE 115-*b* for communications between the UE 115-*b* and the network entity 105-*b* based on whether the antenna blockage condition is detected. Additionally, the UE 115-*b* may select the set of one or more antenna arrays from multiple predetermined sets of antenna arrays of the UE 115-*b*. For example, the predetermined sets of antenna arrays of the UE 115-*b* may include a first predetermined set of antenna arrays that includes two antenna arrays that collectively cover portions of an edge and a face of the UE 115-*b* via an L-shaped module and a second predetermined set of antenna arrays that that includes two antenna arrays that each cover portions of opposite edges of the UE 115-*b*.

In some examples, the UE 115-*b* may select the first set of one or more antenna arrays of the UE 115-*b* based on the antenna blockage condition being detected, where the first set of one or more antenna arrays includes the two antenna arrays that collectively cover the portions of the edge and the face of the UE 115-*b* (e.g., forming the L-shaped module proximal to the edge and the face of the UE 115-*b*). Alternatively, the UE 115-*b* may select the second set of one or more antenna arrays of the UE 115-*b* based on the antenna blockage condition not being detected, where the second set of one or more antenna arrays includes the two antenna arrays that each cover the portions of the opposite edges of the UE 115-*b*.

At 415, the UE 115-*b* may transmit, to the network entity 105-*b*, a message indicative of whether the antenna blockage condition is detected. In some cases, the UE 115-*b* may transmit an indication of the set of one or more antenna arrays selected based on whether the antenna blockage condition is detected. Additionally, or alternatively, the UE 115-*b* may transmit an indication of one or more TCI states associated with communications between the network entity 105-*b* and the UE 115-*b* via the set of one or more antenna arrays.

At 420, the network entity 105-*b* may select a set of one or more communication parameters for communications between the UE 115-*b* and the network entity 105-*b* based on receiving the message. Additionally, the network entity 105-*b* may select the set of one or more communication parameters from multiple sets of communication parameters that each correspond to communications with the UE via respective predetermined sets of antenna arrays of the UE At 425, the UE 115-*b* may communicate with the network entity 105-*b* using the set of one or more antenna arrays in accordance with whether the antenna blockage condition is detected. Additionally, the network entity 105-*b* may communicate with the UE 115-*b* in accordance with the set of one or more communication parameters.

Figure 5:
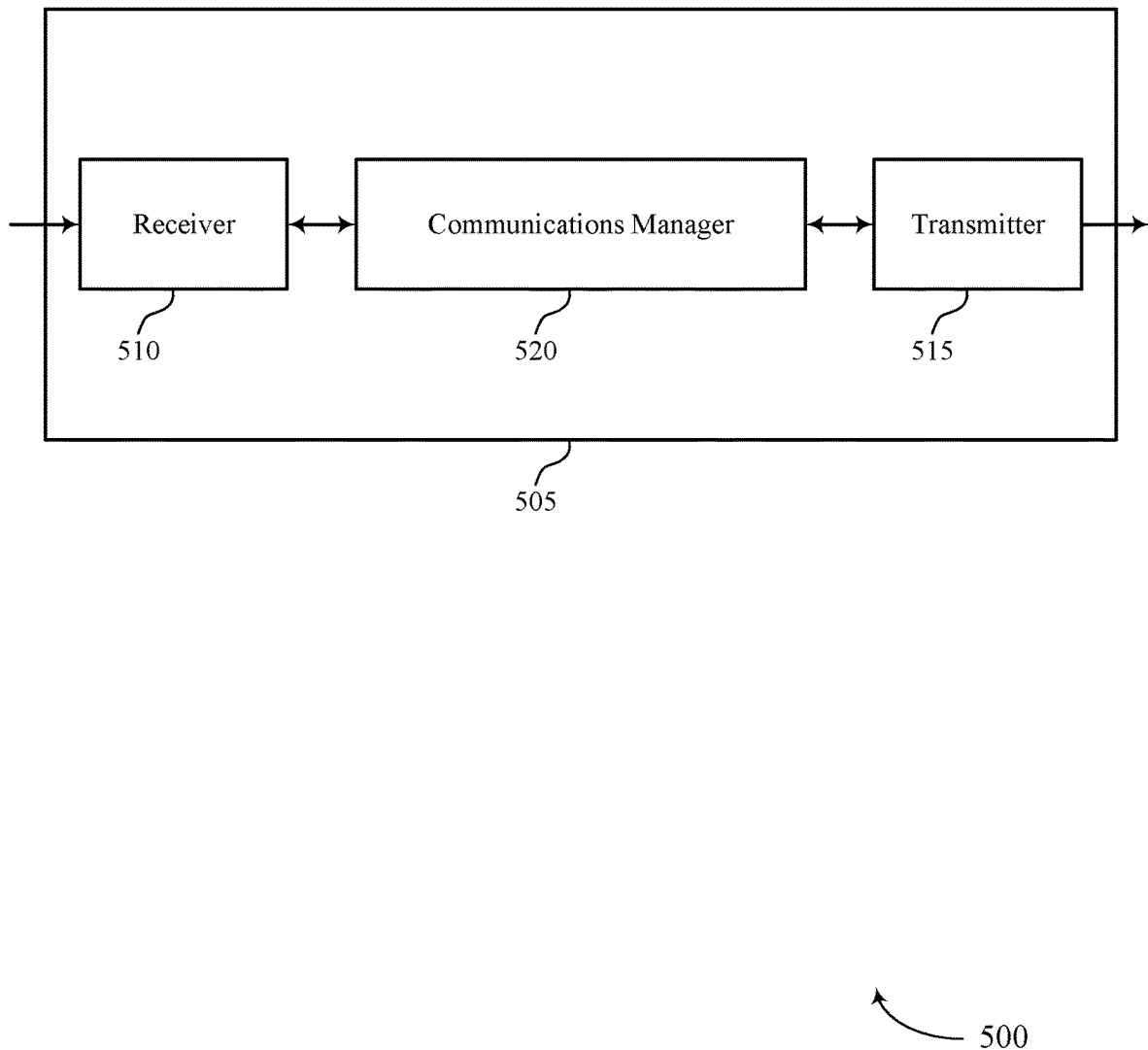
FIGS. 5 and 6 show block diagrams of devices that support methods for selection of antenna arrays and beamforming feedback in accordance with one or more aspects of the present disclosure.

FIG. 5 shows a block diagram 500 of a device 505 that supports methods for selection of antenna arrays and beamforming feedback in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to methods for selection of antenna arrays and beamforming feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods for selection of antenna arrays and beamforming feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of methods for selection of antenna arrays and beamforming feedback as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled to the at least one processor may be configured to perform one or more of the functions described herein (e.g., by executing, by the at least one processor, instructions stored in the memory).

Additionally, or alternatively, in some examples, the communications manager 520, the receiver 510, the transmitter 515, or various combinations or components thereof may be implemented in hardware, code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for monitoring for an antenna blockage condition at the UE. The communications manager 520 may be configured as or otherwise support a means for selecting a set of one or more antenna arrays of the UE for communications between the UE and a network entity, the set of one or more antenna arrays selected from a set of multiple predetermined sets of antenna arrays of the UE based at least in part on whether the antenna blockage condition is detected. The communications manager 520 may be configured as or otherwise support a means for transmitting, to the network entity, a message indicative of whether the antenna blockage condition is detected. The communications manager 520 may be configured as or otherwise support a means for communicating with the network entity using the set of one or more antenna arrays in accordance with whether the antenna blockage condition is detected.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for selection of antenna arrays and transmission of beamforming feedback which may result in reduced processing, reduced power consumption, more efficient utilization of communication resources, among other advantages.

Figure 6:
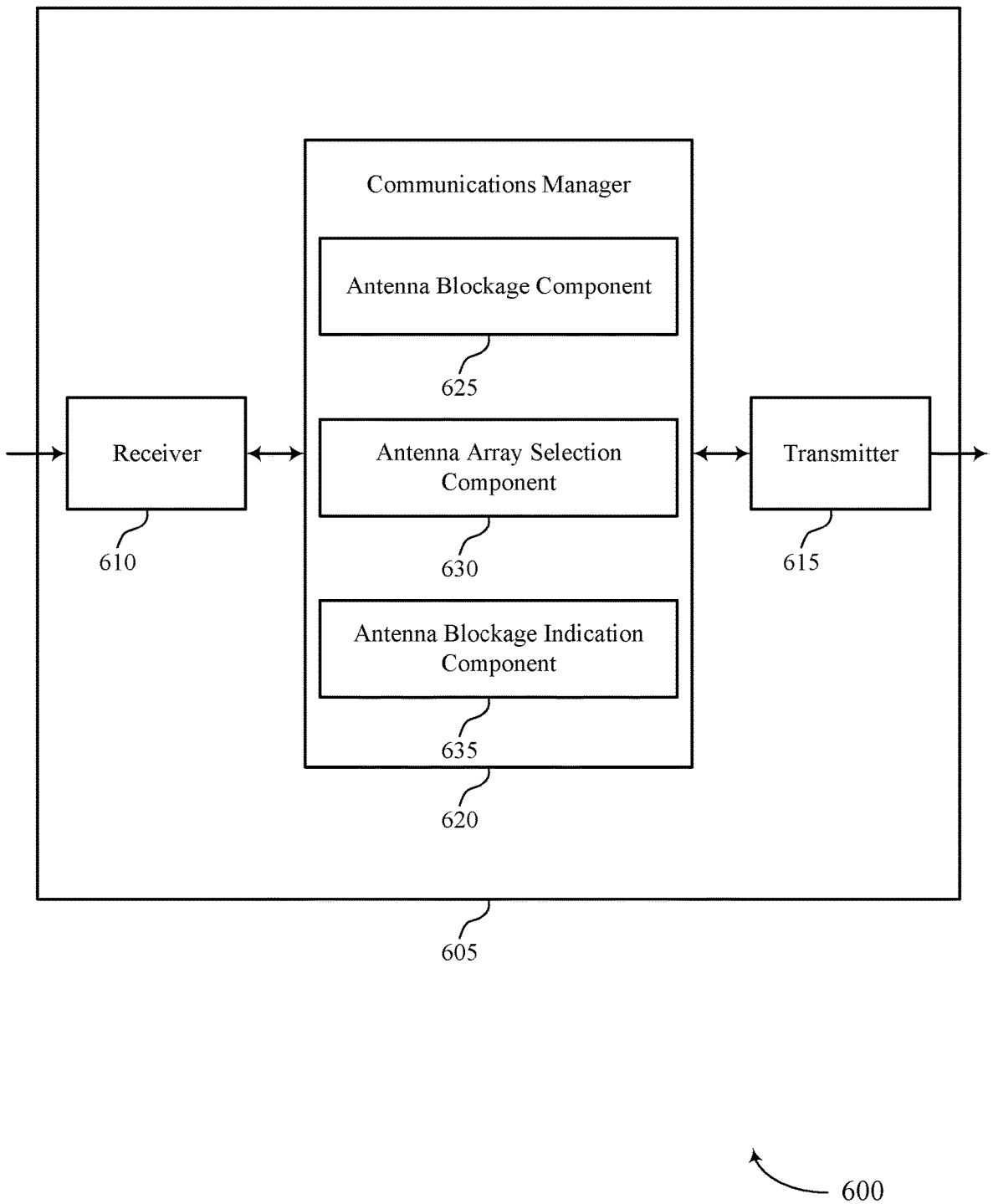

FIG. 6 shows a block diagram 600 of a device 605 that supports methods for selection of antenna arrays and beamforming feedback in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to methods for selection of antenna arrays and beamforming feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to methods for selection of antenna arrays and beamforming feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of methods for selection of antenna arrays and beamforming feedback as described herein. For example, the communications manager 620 may include an antenna blockage component 625, an antenna array selection component 630, an antenna blockage indication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The antenna blockage component 625 may be configured as or otherwise support a means for monitoring for an antenna blockage condition at the UE. The antenna array selection component 630 may be configured as or otherwise support a means for selecting a set of one or more antenna arrays of the UE for communications between the UE and a network entity, the set of one or more antenna arrays selected from a set of multiple predetermined sets of antenna arrays of the UE based at least in part on whether the antenna blockage condition is detected. The antenna blockage indication component 635 may be configured as or otherwise support a means for transmitting, to the network entity, a message indicative of whether the antenna blockage condition is detected. The antenna array selection component 630 may be configured as or otherwise support a means for communicating with the network entity using the set of one or more antenna arrays in accordance with whether the antenna blockage condition is detected.

Figure 7:
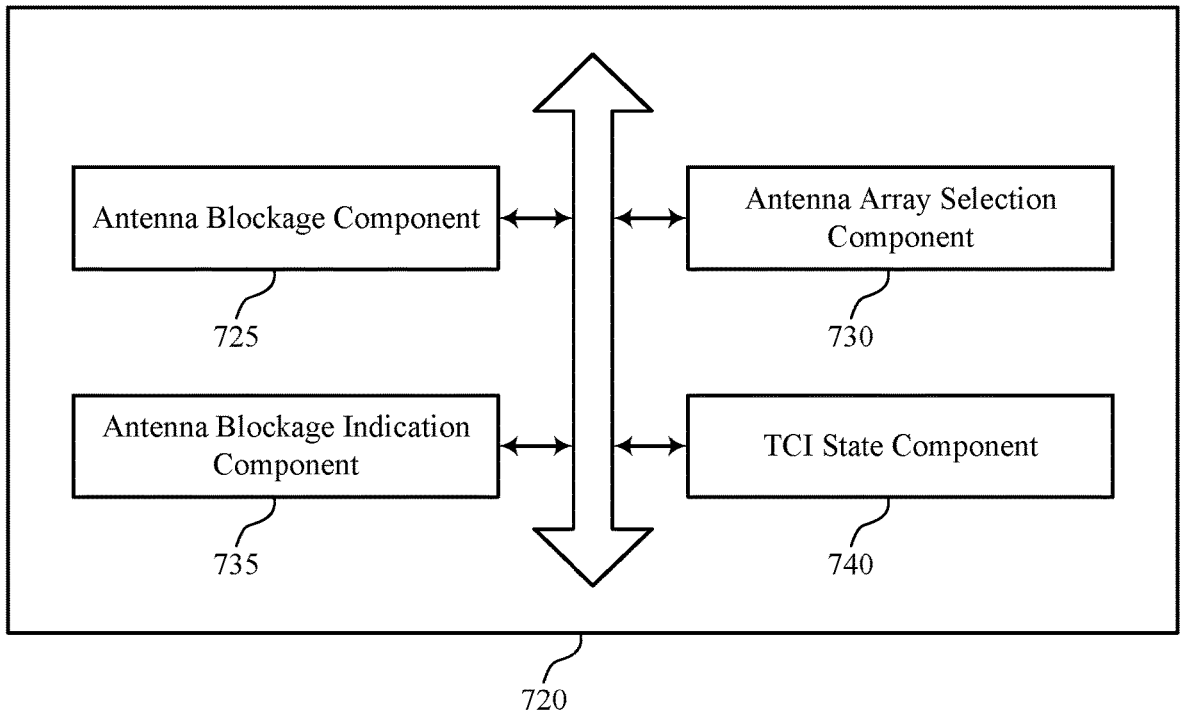
FIG. 7 shows a block diagram of a communications manager that supports methods for selection of antenna arrays and beamforming feedback in accordance with one or more aspects of the present disclosure.

FIG. 7 shows a block diagram 700 of a communications manager 720 that supports methods for selection of antenna arrays and beamforming feedback in accordance with one or more aspects of the present disclosure. The communications manager 720 may be an example of aspects of a communications manager 520, a communications manager 620, or both, as described herein. The communications manager 720, or various components thereof, may be an example of means for performing various aspects of methods for selection of antenna arrays and beamforming feedback as described herein. For example, the communications manager 720 may include an antenna blockage component 725, an antenna array selection component 730, an antenna blockage indication component 735, a TCI state component 740, or any combination thereof. Each of these components may communicate, directly or indirectly, with one another (e.g., via one or more buses).

The communications manager 720 may support wireless communications at a UE in accordance with examples as disclosed herein. The antenna blockage component 725 may be configured as or otherwise support a means for monitoring for an antenna blockage condition at the UE. The antenna array selection component 730 may be configured as or otherwise support a means for selecting a set of one or more antenna arrays of the UE for communications between the UE and a network entity, the set of one or more antenna arrays selected from a set of multiple predetermined sets of antenna arrays of the UE based at least in part on whether the antenna blockage condition is detected. The antenna blockage indication component 735 may be configured as or otherwise support a means for transmitting, to the network entity, a message indicative of whether the antenna blockage condition is detected. In some examples, the antenna array selection component 730 may be configured as or otherwise support a means for communicating with the network entity using the set of one or more antenna arrays in accordance with whether the antenna blockage condition is detected.

In some examples, to support selecting the set of one or more antenna arrays of the UE, the antenna array selection component 730 may be configured as or otherwise support a means for selecting a first set of one or more antenna arrays of the UE based at least in part on the antenna blockage condition being detected, where the first set of one or more antenna arrays includes two antenna arrays that collectively cover portions of an edge and a face of the UE.

In some examples, the two antenna arrays form an L-shaped module proximal to the edge and the face of the UE.

In some examples, to support selecting the set of one or more antenna arrays of the UE, the antenna array selection component 730 may be configured as or otherwise support a means for selecting a first set of one or more antenna arrays of the UE based at least in part on the antenna blockage condition not being detected, where the first set of one or more antenna arrays includes two antenna arrays that each cover portions of opposite edges of the UE.

In some examples, to support monitoring for the antenna blockage condition, the antenna blockage component 725 may be configured as or otherwise support a means for sensing, via FMCW radar or via another sensing mechanism, for a physical blockage that is proximal to the UE.

In some examples, to support transmitting the message that is indicative of whether the antenna blockage condition is detected, the antenna blockage indication component 735 may be configured as or otherwise support a means for transmitting an indication of the set of one or more antenna arrays selected based at least in part on whether the antenna blockage condition is detected.

In some examples, to support transmitting the message that is indicative of whether the antenna blockage condition is detected, the TCI state component 740 may be configured as or otherwise support a means for transmitting an indication of one or more TCI states associated with communications between the network entity and the UE via the set of one or more antenna arrays.

In some examples, to support monitoring for the antenna blockage condition at the UE, the antenna blockage component 725 may be configured as or otherwise support a means for monitoring for satisfaction of a proximity threshold with respect to at least one antenna array of the UE.

In some examples, the antenna blockage condition is based at least in part on a proximity of a hand, a finger, or both, of a user of the UE satisfying a proximity threshold.

In some examples, the antenna blockage condition is associated with spherical coverage.

In some examples, the set of multiple predetermined sets of antenna arrays of the UE include a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

Figure 8:
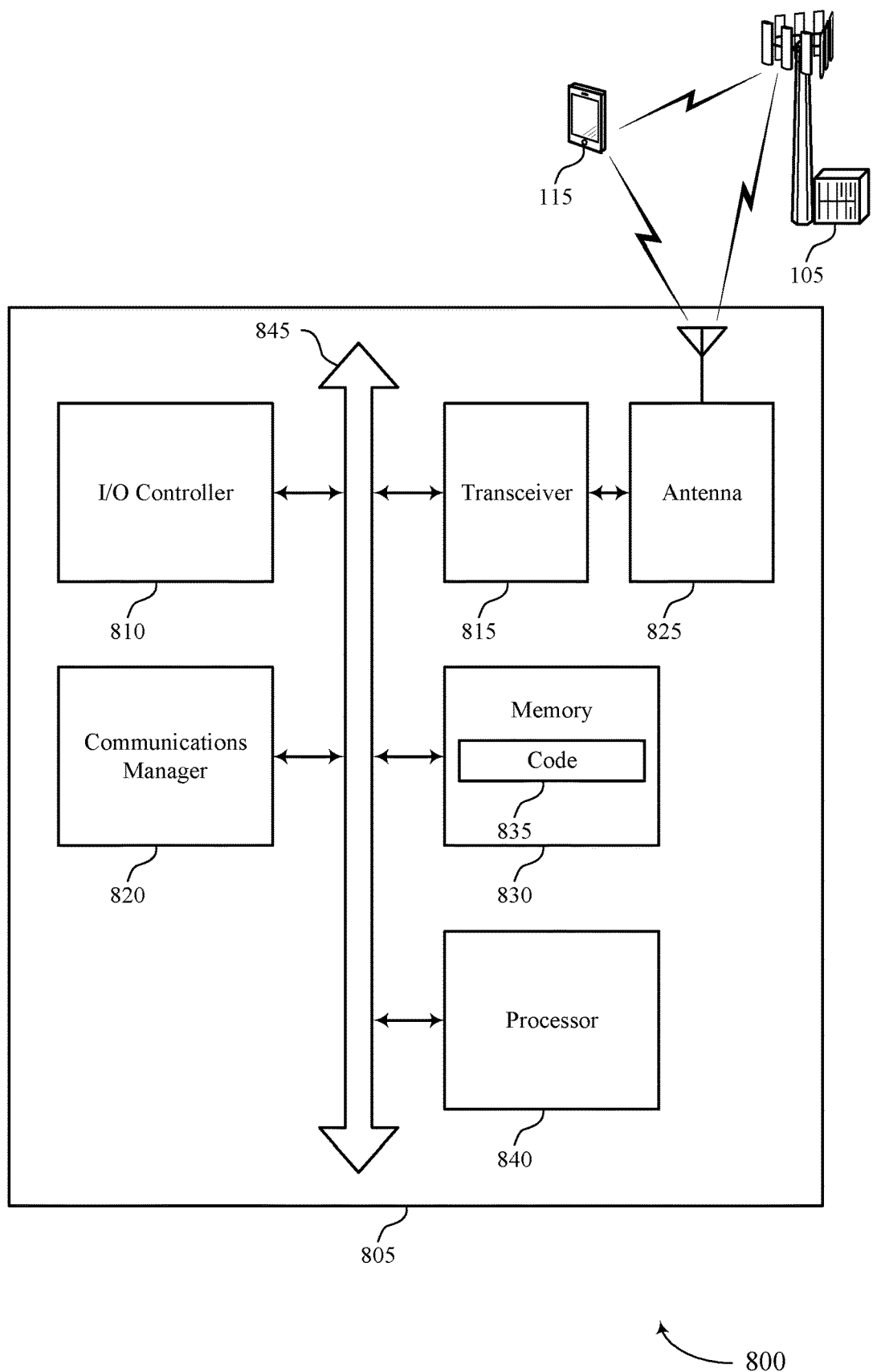
FIG. 8 shows a diagram of a system including a device that supports methods for selection of antenna arrays and beamforming feedback in accordance with one or more aspects of the present disclosure.

FIG. 8 shows a diagram of a system 800 including a device 805 that supports methods for selection of antenna arrays and beamforming feedback in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting methods for selection of antenna arrays and beamforming feedback). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for monitoring for an antenna blockage condition at the UE. The communications manager 820 may be configured as or otherwise support a means for selecting a set of one or more antenna arrays of the UE for communications between the UE and a network entity, the set of one or more antenna arrays selected from a set of multiple predetermined sets of antenna arrays of the UE based at least in part on whether the antenna blockage condition is detected. The communications manager 820 may be configured as or otherwise support a means for transmitting, to the network entity, a message indicative of whether the antenna blockage condition is detected. The communications manager 820 may be configured as or otherwise support a means for communicating with the network entity using the set of one or more antenna arrays in accordance with whether the antenna blockage condition is detected.

By including or configuring the communications manager 820 in accordance with examples as described herein, the device 805 may support techniques for selection of antenna arrays and transmission of beamforming feedback which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of methods for selection of antenna arrays and beamforming feedback as described herein, or the processor 840 and the memory 830 may be otherwise configured to perform or support such operations.

Figure 9:
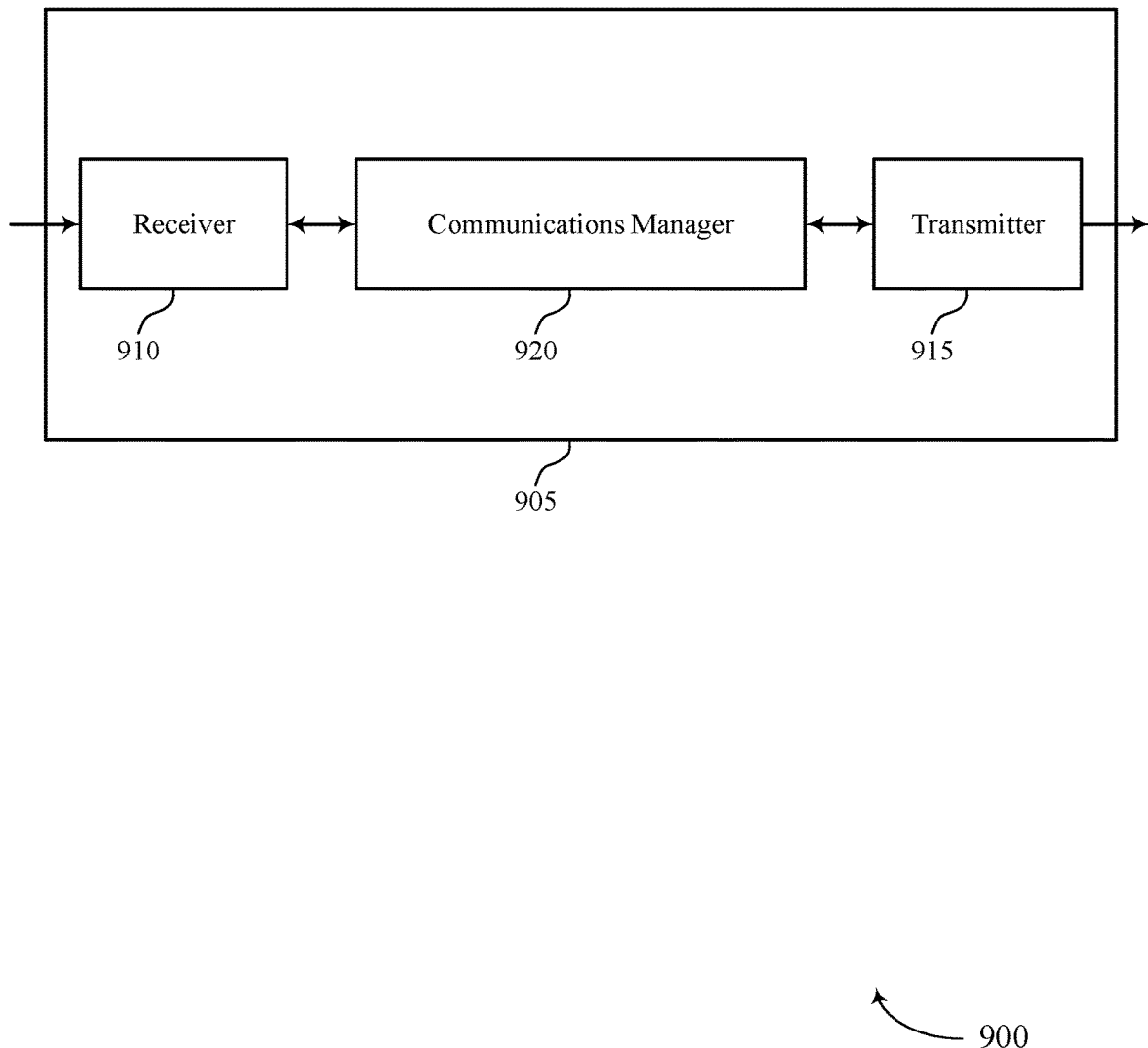
FIGS. 9 and 10 show block diagrams of devices that support methods for selection of antenna arrays and beamforming feedback in accordance with one or more aspects of the present disclosure.

FIG. 9 shows a block diagram 900 of a device 905 that supports methods for selection of antenna arrays and beamforming feedback in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of methods for selection of antenna arrays and beamforming feedback as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a GPU, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for receiving a message indicative of whether an antenna blockage condition is detected at a UE that includes a set of multiple antenna arrays. The communications manager 920 may be configured as or otherwise support a means for selecting a set of one or more communication parameters for communications between the UE and the network entity based at least in part on receiving the message, the set of one or more communication parameters selected from a set of multiple sets of communication parameters that each correspond to communications with the UE via respective predetermined sets of antenna arrays of the UE. The communications manager 920 may be configured as or otherwise support a means for communicating with the UE in accordance with the set of one or more communication parameters.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for selection of antenna arrays and transmission of beamforming feedback which may result in reduced processing, reduced power consumption, and more efficient utilization of communication resources, among other advantages.

Figure 10:
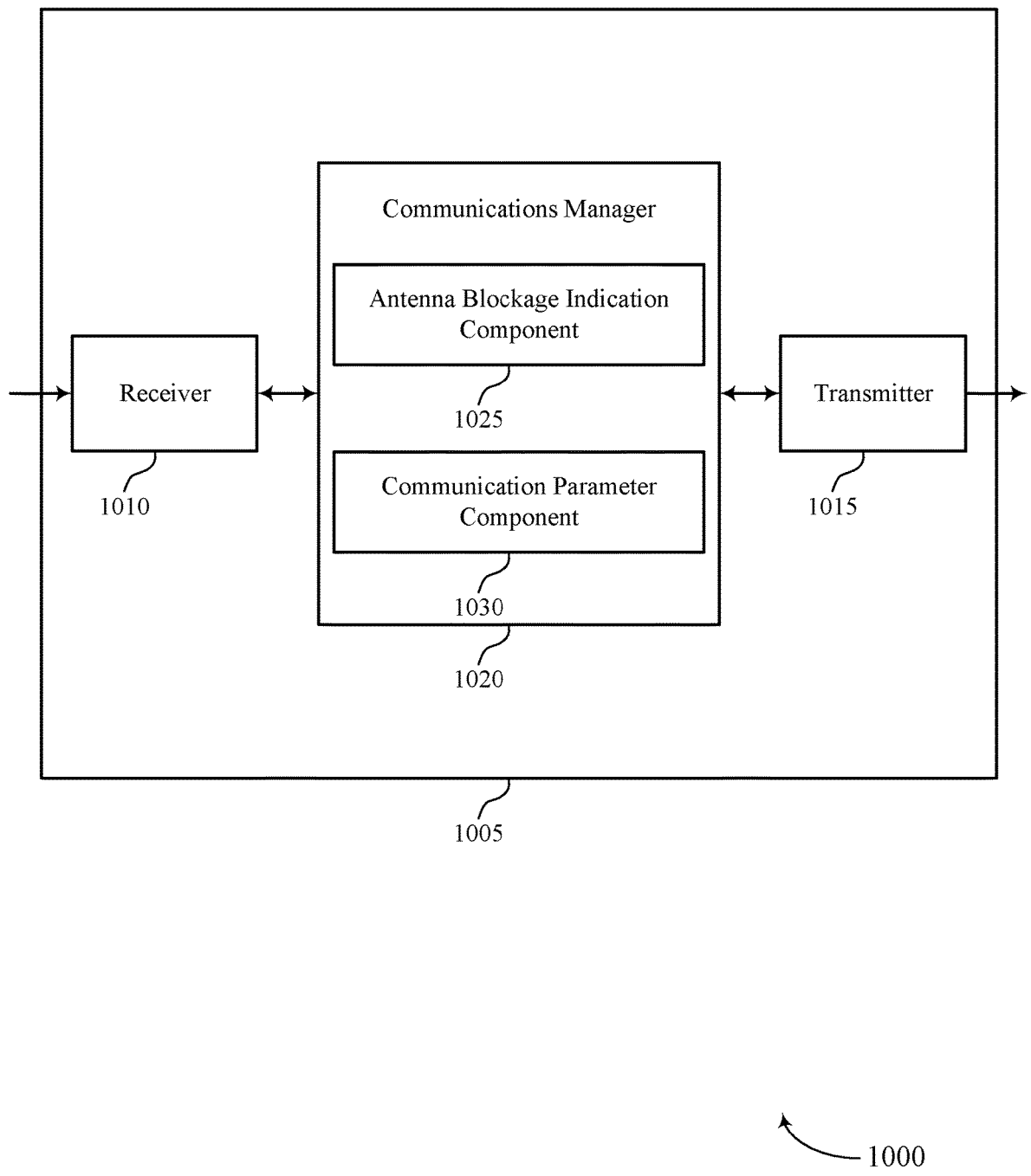

FIG. 10 shows a block diagram 1000 of a device 1005 that supports methods for selection of antenna arrays and beamforming feedback in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of methods for selection of antenna arrays and beamforming feedback as described herein. For example, the communications manager 1020 may include an antenna blockage indication component 1025 a communication parameter component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The antenna blockage indication component 1025 may be configured as or otherwise support a means for receiving a message indicative of whether an antenna blockage condition is detected at a UE that includes a set of multiple antenna arrays. The communication parameter component 1030 may be configured as or otherwise support a means for selecting a set of one or more communication parameters for communications between the UE and the network entity based at least in part on receiving the message, the set of one or more communication parameters selected from a set of multiple sets of communication parameters that each correspond to communications with the UE via respective predetermined sets of antenna arrays of the UE. The communication parameter component 1030 may be configured as or otherwise support a means for communicating with the UE in accordance with the set of one or more communication parameters.

Figure 11:
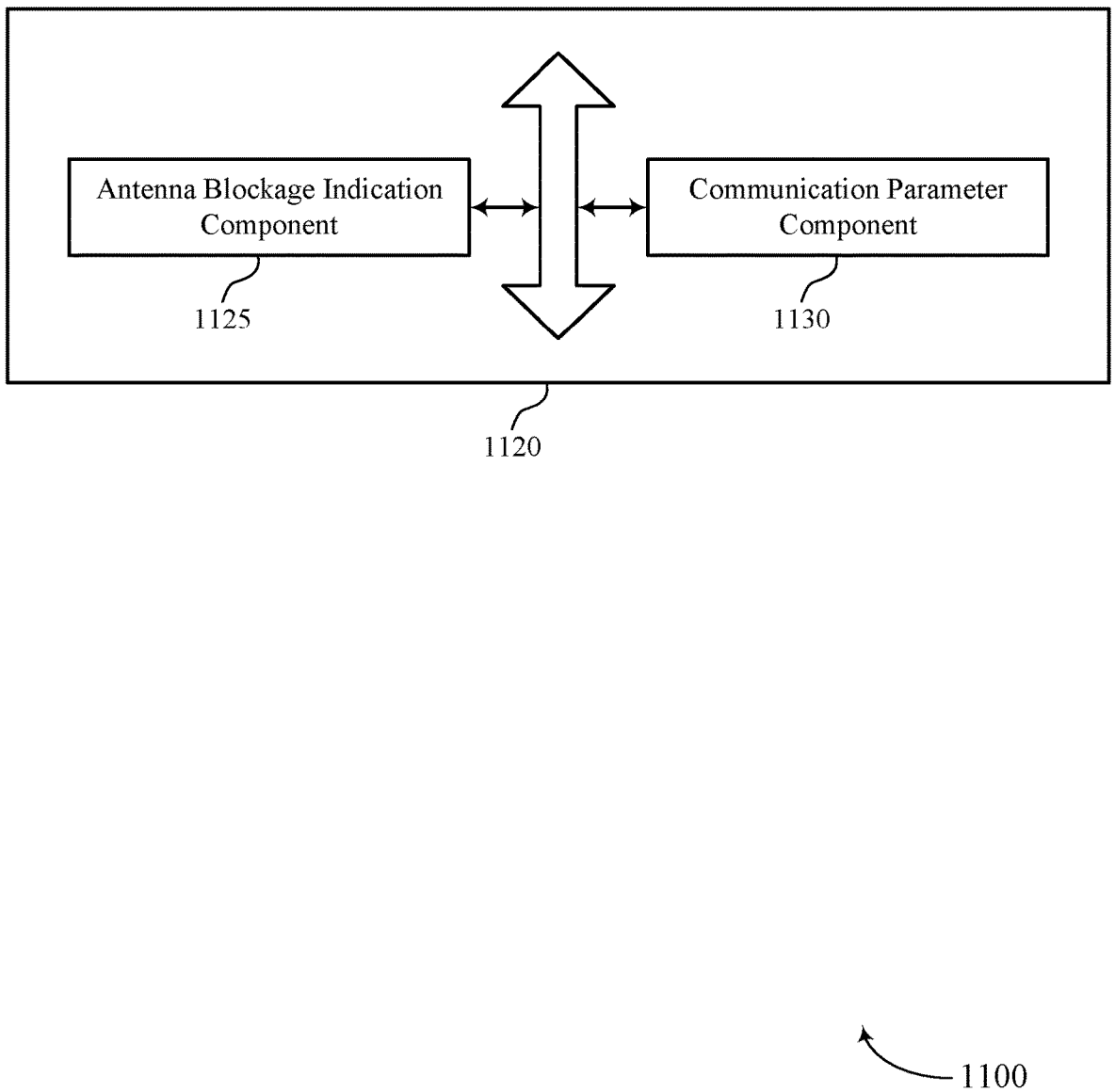
FIG. 11 shows a block diagram of a communications manager that supports methods for selection of antenna arrays and beamforming feedback in accordance with one or more aspects of the present disclosure.

FIG. 11 shows a block diagram 1100 of a communications manager 1120 that supports methods for selection of antenna arrays and beamforming feedback in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of methods for selection of antenna arrays and beamforming feedback as described herein. For example, the communications manager 1120 may include an antenna blockage indication component 1125 a communication parameter component 1130, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The antenna blockage indication component 1125 may be configured as or otherwise support a means for receiving a message indicative of whether an antenna blockage condition is detected at a UE that includes a set of multiple antenna arrays. The communication parameter component 1130 may be configured as or otherwise support a means for selecting a set of one or more communication parameters for communications between the UE and the network entity based at least in part on receiving the message, the set of one or more communication parameters selected from a set of multiple sets of communication parameters that each correspond to communications with the UE via respective predetermined sets of antenna arrays of the UE. In some examples, the communication parameter component 1130 may be configured as or otherwise support a means for communicating with the UE in accordance with the set of one or more communication parameters.

In some examples, to support receiving the message that is indicative of whether the antenna blockage condition is detected, the antenna blockage indication component 1125 may be configured as or otherwise support a means for receiving an indication of a set of one or more antenna arrays selected by the UE from the respective predetermined sets of antenna arrays.

In some examples, to support receiving the message that is indicative of whether the antenna blockage condition is detected, the antenna blockage indication component 1125 may be configured as or otherwise support a means for receiving an indication of one or more TCI states associated with communications between the network entity and the UE via a set of one or more antenna arrays selected by the UE from the respective predetermined sets of antenna arrays.

In some examples, the antenna blockage condition is based at least in part on a proximity of a hand, a finger, or both, of a user of the UE satisfying a proximity threshold.

In some examples, the antenna blockage condition is associated with spherical coverage.

In some examples, the predetermined sets of antenna arrays of the UE include a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

Figure 12:
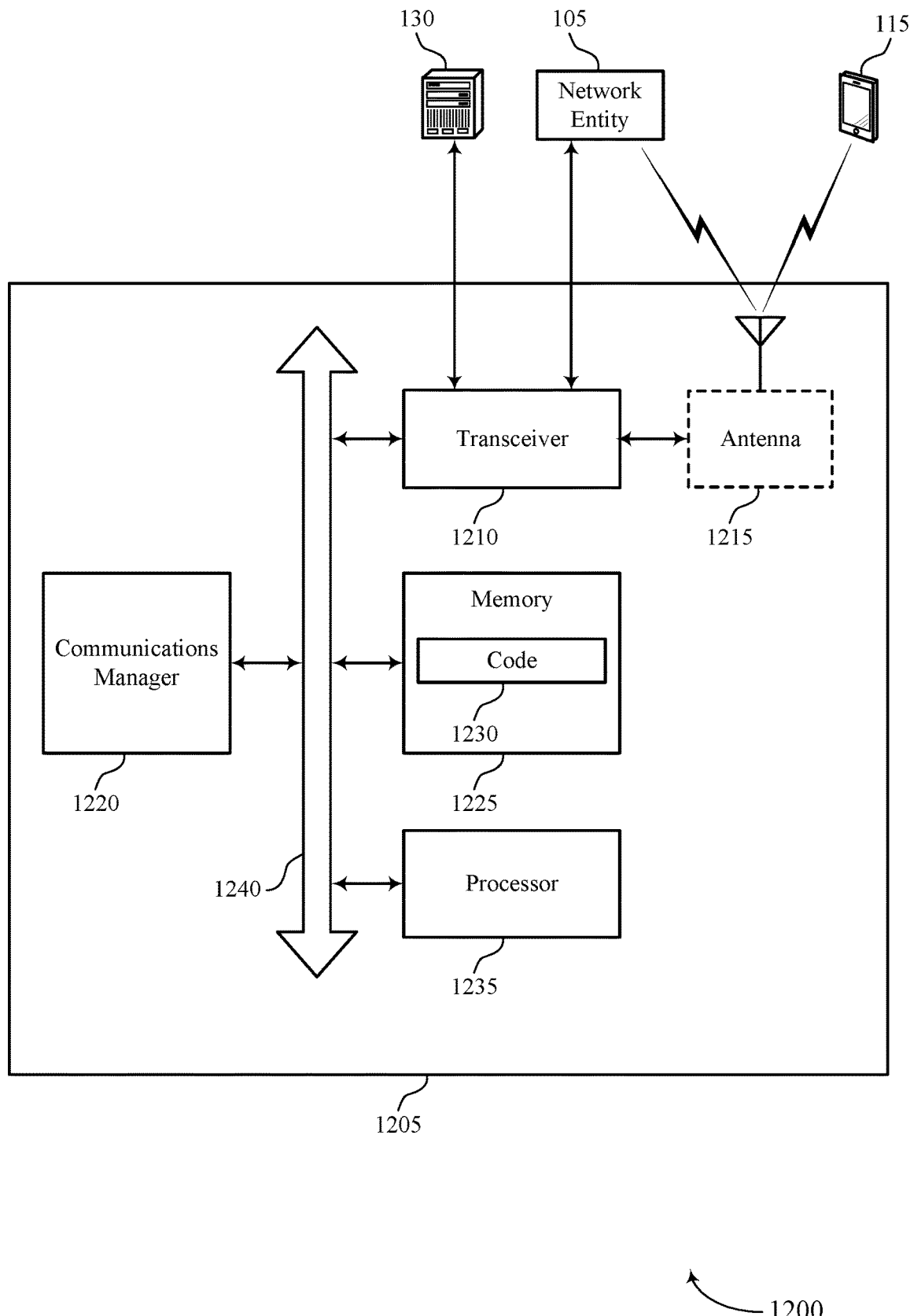
FIG. 12 shows a diagram of a system including a device that supports methods for selection of antenna arrays and beamforming feedback in accordance with one or more aspects of the present disclosure.

FIG. 12 shows a diagram of a system 1200 including a device 1205 that supports methods for selection of antenna arrays and beamforming feedback in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, a GPU, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting methods for selection of antenna arrays and beamforming feedback). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for receiving a message indicative of whether an antenna blockage condition is detected at a UE that includes a set of multiple antenna arrays. The communications manager 1220 may be configured as or otherwise support a means for selecting a set of one or more communication parameters for communications between the UE and the network entity based at least in part on receiving the message, the set of one or more communication parameters selected from a set of multiple sets of communication parameters that each correspond to communications with the UE via respective predetermined sets of antenna arrays of the UE. The communications manager 1220 may be configured as or otherwise support a means for communicating with the UE in accordance with the set of one or more communication parameters.

By including or configuring the communications manager 1220 in accordance with examples as described herein, the device 1205 may support techniques for selection of antenna arrays and transmission of beamforming feedback which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of methods for selection of antenna arrays and beamforming feedback as described herein, or the processor 1235 and the memory 1225 may be otherwise configured to perform or support such operations.

Figure 13:
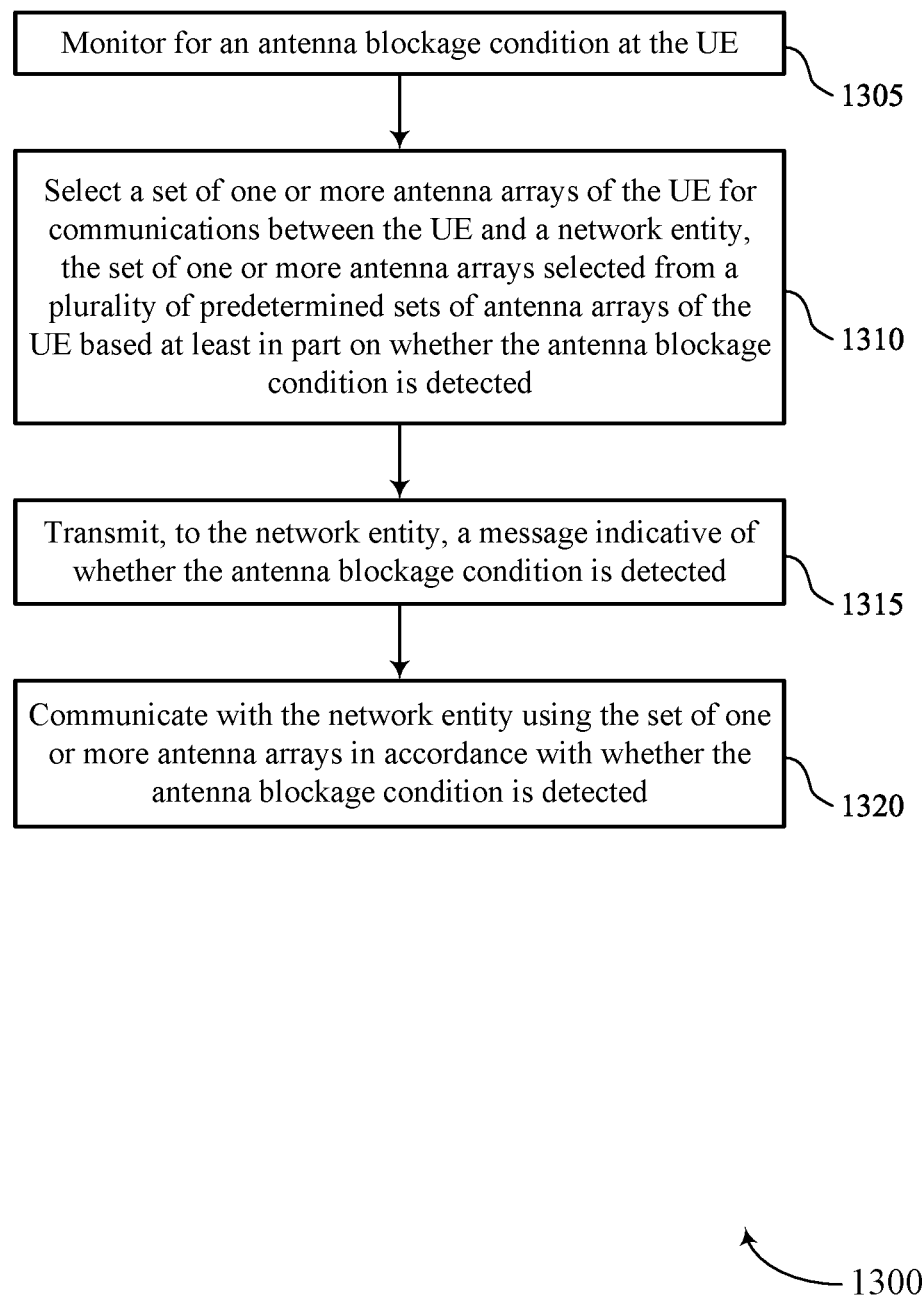
FIGS. 13 and 14 show flowcharts illustrating methods that support methods for selection of antenna arrays and beamforming feedback in accordance with one or more aspects of the present disclosure.

FIG. 13 shows a flowchart illustrating a method 1300 that supports methods for selection of antenna arrays and beamforming feedback in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include monitoring for an antenna blockage condition at the UE. The operations of 1305 may be performed in accordance with examples as disclosed herein. In some examples, aspects of the operations of 1305 may be performed by an antenna blockage component 725 as described with reference to FIG. 7.

At 1310, the method may include selecting a set of one or more antenna arrays of the UE for communications between the UE and a network entity, the set of one or more antenna arrays selected from a set of multiple predetermined sets of antenna arrays of the UE based at least in part on whether the antenna blockage condition is detected. The operations of 1310 may be performed in accordance with examples as disclosed herein. In some examples, aspects of the operations of 1310 may be performed by an antenna array selection component 730 as described with reference to FIG. 7.

At 1315, the method may include transmitting, to the network entity, a message indicative of whether the antenna blockage condition is detected. The operations of 1315 may be performed in accordance with examples as disclosed herein. In some examples, aspects of the operations of 1315 may be performed by an antenna blockage indication component 735 as described with reference to FIG. 7.

At 1320, the method may include communicating with the network entity using the set of one or more antenna arrays in accordance with whether the antenna blockage condition is detected. The operations of 1320 may be performed in accordance with examples as disclosed herein. In some examples, aspects of the operations of 1320 may be performed by an antenna array selection component 730 as described with reference to FIG. 7.

Figure 14:
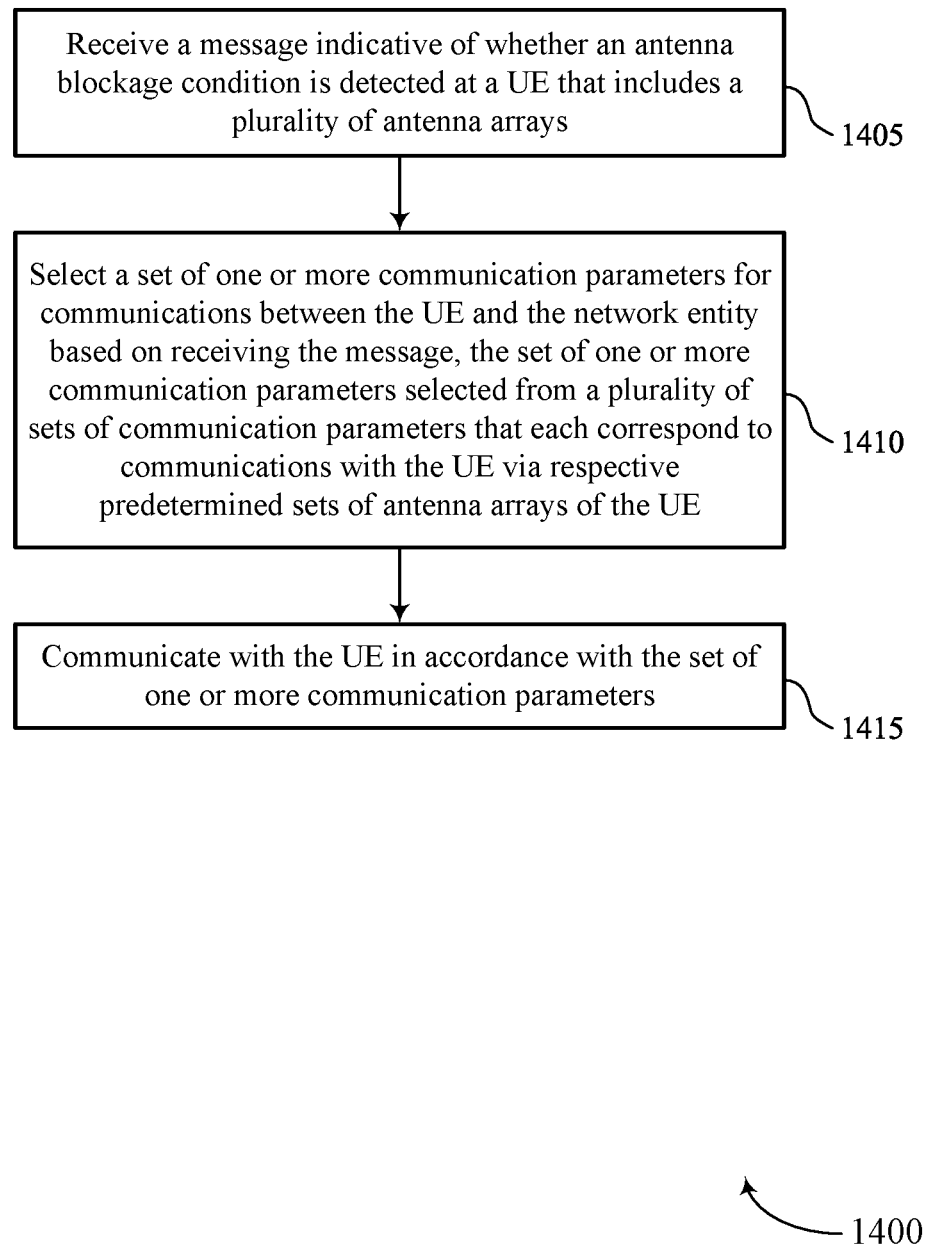

FIG. 14 shows a flowchart illustrating a method 1400 that supports methods for selection of antenna arrays and beamforming feedback in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include receiving a message indicative of whether an antenna blockage condition is detected at a UE that includes a set of multiple antenna arrays. The operations of 1405 may be performed in accordance with examples as disclosed herein. In some examples, aspects of the operations of 1405 may be performed by an antenna blockage indication component 1125 as described with reference to FIG. 11.

At 1410, the method may include selecting a set of one or more communication parameters for communications between the UE and the network entity based at least in part on receiving the message, the set of one or more communication parameters selected from a set of multiple sets of communication parameters that each correspond to communications with the UE via respective predetermined sets of antenna arrays of the UE. The operations of 1410 may be performed in accordance with examples as disclosed herein. In some examples, aspects of the operations of 1410 may be performed by a communication parameter component 1130 as described with reference to FIG. 11.

At 1415, the method may include communicating with the UE in accordance with the set of one or more communication parameters. The operations of 1415 may be performed in accordance with examples as disclosed herein. In some examples, aspects of the operations of 1415 may be performed by a communication parameter component 1130 as described with reference to FIG. 11.

The following provides an overview of aspects of the present disclosure:

Aspect 1: A method for wireless communications at a UE, comprising: monitoring for an antenna blockage condition at the UE; selecting a set of one or more antenna arrays of the UE for communications between the UE and a network entity, the set of one or more antenna arrays selected from a plurality of predetermined sets of antenna arrays of the UE based at least in part on whether the antenna blockage condition is detected; transmitting, to the network entity, a message indicative of whether the antenna blockage condition is detected; and communicating with the network entity using the set of one or more antenna arrays in accordance with whether the antenna blockage condition is detected.

Aspect 2: The method of aspect 1, wherein selecting the set of one or more antenna arrays of the UE further comprises: selecting a first set of one or more antenna arrays of the UE based at least in part on the antenna blockage condition being detected, wherein the first set of one or more antenna arrays includes two antenna arrays that collectively cover portions of an edge and a face of the UE.

Aspect 3: The method of aspect 2, wherein the two antenna arrays form an L-shaped module proximal to the edge and the face of the UE.

Aspect 4: The method of aspect 1, wherein selecting the set of one or more antenna arrays of the UE further comprises: selecting a first set of one or more antenna arrays of the UE based at least in part on the antenna blockage condition not being detected, wherein the first set of one or more antenna arrays includes two antenna arrays that each cover portions of opposite edges of the UE.

Aspect 5: The method of any of aspects 1 through 4, wherein monitoring for the antenna blockage condition further comprises: sensing, via FMCW radar or via another sensing mechanism, for a physical blockage that is proximal to the UE.

Aspect 6: The method of any of aspects 1 through 5, wherein transmitting the message that is indicative of whether the antenna blockage condition is detected further comprises: transmitting an indication of the set of one or more antenna arrays selected based at least in part on whether the antenna blockage condition is detected.

Aspect 7: The method of any of aspects 1 through 6, wherein transmitting the message that is indicative of whether the antenna blockage condition is detected further comprises: transmitting an indication of one or more TCI states associated with communications between the network entity and the UE via the set of one or more antenna arrays.

Aspect 8: The method of any of aspects 1 through 7, wherein monitoring for the antenna blockage condition at the UE further comprises: monitoring for satisfaction of a proximity threshold with respect to at least one antenna array of the UE.

Aspect 9: The method of any of aspects 1 through 8, wherein the antenna blockage condition is based at least in part on a proximity of a hand, a finger, or both, of a user of the UE satisfying a proximity threshold.

Aspect 10: The method of any of aspects 1 through 9, wherein the antenna blockage condition is associated with spherical coverage.

Aspect 11: The method of any of aspects 1 through 10, wherein the predetermined sets of antenna arrays of the UE comprise a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

Aspect 12: A method for wireless communications at a network entity, comprising: receiving a message indicative of whether an antenna blockage condition is detected at a UE that includes a plurality of antenna arrays; selecting a set of one or more communication parameters for communications between the UE and the network entity based on receiving the message, the set of one or more communication parameters selected from a plurality of sets of communication parameters that each correspond to communications with the UE via respective predetermined sets of antenna arrays of the UE; and communicating with the UE in accordance with the set of one or more communication parameters.

Aspect 13: The method of aspect 12, wherein receiving the message that is indicative of whether the antenna blockage condition is detected further comprises: receiving an indication of a set of one or more antenna arrays selected by the UE from the respective predetermined sets of antenna arrays.

Aspect 14: The method of any of aspects 12 through 13, wherein receiving the message that is indicative of whether the antenna blockage condition is detected further comprises: receiving an indication of one or more TCI states associated with communications between the network entity and the UE via a set of one or more antenna arrays selected by the UE from the respective predetermined sets of antenna arrays.

Aspect 15: The method of any of aspects 12 through 14, wherein the antenna blockage condition is based at least in part on a proximity of a hand, a finger, or both, of a user of the UE satisfying a proximity threshold.

Aspect 16: The method of any of aspects 12 through 15, wherein the antenna blockage condition is associated with spherical coverage.

Aspect 17: The method of any of aspects 12 through 16, wherein the predetermined sets of antenna arrays of the UE comprise a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

Aspect 18: An apparatus for wireless communications at a UE, comprising a processor; memory coupled with the processor; and instructions stored in the memory and executable by the processor to cause the apparatus to perform a method of any of aspects 1 through 11.

Aspect 19: An apparatus for wireless communications at a UE, comprising at least one means for performing a method of any of aspects 1 through 11.

Aspect 20: A non-transitory computer-readable medium storing code for wireless communications at a UE, the code comprising instructions executable by a processor to perform a method of any of aspects 1 through 11.

Aspect 21: An apparatus for wireless communications at a network entity, comprising a processor; memory coupled with the processor; and instructions stored in the memory and executable by the processor to cause the apparatus to perform a method of any of aspects 12 through 17.

Aspect 22: An apparatus for wireless communications at a network entity, comprising at least one means for performing a method of any of aspects 12 through 17.

Aspect 23: A non-transitory computer-readable medium storing code for wireless communications at a network entity, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, a GPU, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    monitoring for an antenna blockage condition at the UE;
    switching to a set of one or more antenna arrays of the UE for communications between the UE and a network entity, the set of one or more antenna arrays selected from a plurality of predetermined sets of antenna arrays of the UE based at least in part on whether the antenna blockage condition is detected;
    transmitting, to the network entity based at least in part on switching to the set of one or more antenna arrays, a message indicative of whether the antenna blockage condition is detected; and
    communicating with the network entity using the set of one or more antenna arrays in accordance with whether the antenna blockage condition is detected.

2. The method of claim 1, wherein switching to the set of one or more antenna arrays of the UE further comprises:
    switching to a first set of one or more antenna arrays of the UE based at least in part on the antenna blockage condition being detected, wherein the first set of one or more antenna arrays includes two antenna arrays that collectively cover portions of an edge and a face of the UE.

3. The method of claim 2, wherein the two antenna arrays form an L-shaped module proximal to the edge and the face of the UE.

4. The method of claim 1, wherein switching to the set of one or more antenna arrays of the UE further comprises:
    switching to a first set of one or more antenna arrays of the UE based at least in part on the antenna blockage condition not being detected, wherein the first set of one or more antenna arrays includes two antenna arrays that each cover portions of opposite edges of the UE.

5. The method of claim 1, wherein monitoring for the antenna blockage condition further comprises:
sensing, via frequency-modulated continuous-wave radar or via another sensing mechanism, for a physical blockage that is proximal to the UE.

6. The method of claim 1, wherein transmitting the message that is indicative of whether the antenna blockage condition is detected further comprises:
transmitting an indication of the set of one or more antenna arrays switched to by the UE based at least in part on whether the antenna blockage condition is detected.

7. The method of claim 1, wherein transmitting the message that is indicative of whether the antenna blockage condition is detected further comprises:
transmitting an indication of one or more transmission configuration indicator states associated with communications between the network entity and the UE via the set of one or more antenna arrays.

8. The method of claim 1, wherein monitoring for the antenna blockage condition at the UE further comprises:
monitoring for satisfaction of a proximity threshold with respect to at least one antenna array of the UE.

9. The method of claim 1, wherein the antenna blockage condition is based at least in part on a proximity of a hand, a finger, or both, of a user of the UE satisfying a proximity threshold.

10. The method of claim 1, wherein the antenna blockage condition is associated with spherical coverage.

11. The method of claim 1, wherein the plurality of predetermined sets of antenna arrays of the UE comprise a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

12. A method for wireless communications at a network entity, comprising:
receiving a message indicative of whether an antenna blockage condition is detected at a user equipment (UE) that includes a plurality of antenna arrays based at least in part on the UE switching to a set of one or more antenna arrays of the plurality of antenna arrays;
switching to a set of one or more communication parameters for communications between the UE and the network entity based on receiving the message, the set of one or more communication parameters selected from a plurality of sets of communication parameters that each correspond to communications with the UE via respective predetermined sets of antenna arrays of the UE, wherein the set of one or more communication parameters correspond to communications with the UE via the set of one or more antenna arrays switched to by the UE, and
communicating with the UE in accordance with the set of one or more communication parameters.

13. The method of claim 12, wherein receiving the message that is indicative of whether the antenna blockage condition is detected further comprises:
receiving an indication of a set of one or more antenna arrays switched to by the UE from the respective predetermined sets of antenna arrays.

14. The method of claim 12, wherein receiving the message that is indicative of whether the antenna blockage condition is detected further comprises:
receiving an indication of one or more transmission configuration indicator states associated with communications between the network entity and the UE via a set of one or more antenna arrays selected by the UE from the respective predetermined sets of antenna arrays.

15. The method of claim 12, wherein the antenna blockage condition is based at least in part on a proximity of a hand, a finger, or both, of a user of the UE satisfying a proximity threshold.

16. The method of claim 12, wherein the antenna blockage condition is associated with spherical coverage.

17. The method of claim 12, wherein the predetermined sets of antenna arrays of the UE comprise a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

18. An apparatus for wireless communications at a user equipment (UE), comprising:
one or more processors; and
one or more memories coupled to the one or more processors, the one or more memories storing instructions executable by the one or more processors to cause the apparatus to:
monitor for an antenna blockage condition at the UE;
switch to a set of one or more antenna arrays of the UE for communications between the UE and a network entity, the set of one or more antenna arrays selected from a plurality of predetermined sets of antenna arrays of the UE based at least in part on whether the antenna blockage condition is detected;
transmit, to the network entity based at least in part on the set of one or more antenna arrays being switched to, a message indicative of whether the antenna blockage condition is detected; and
communicate with the network entity using the set of one or more antenna arrays in accordance with whether the antenna blockage condition is detected.

19. The apparatus of claim 18, wherein the instructions to switch to the set of one or more antenna arrays of the UE are further executable by the one or more processors to cause the apparatus to:
switch to a first set of one or more antenna arrays of the UE based at least in part on the antenna blockage condition being detected, wherein the first set of one or more antenna arrays includes two antenna arrays that collectively cover portions of an edge and a face of the UE.

20. The apparatus of claim 19, wherein the two antenna arrays form an L-shaped module proximal to the edge and the face of the UE.

21. The apparatus of claim 18, wherein the instructions to switch to the set of one or more antenna arrays of the UE are further executable by the one or more processors to cause the apparatus to:
switch to a first set of one or more antenna arrays of the UE based at least in part on the antenna blockage condition not being detected, wherein the first set of one or more antenna arrays includes two antenna arrays that each cover portions of opposite edges of the UE.

22. The apparatus of claim 18, wherein the instructions to monitor for the antenna blockage condition are further executable by the one or more processors to cause the apparatus to:
  sensing, via frequency-modulated continuous-wave radar or via another sensing mechanism, for a physical blockage that is proximal to the UE.

23. The apparatus of claim 18, wherein the instructions to transmit the message that is indicative of whether the antenna blockage condition is detected are further executable by the one or more processors to cause the apparatus to:
  transmit an indication of the set of one or more antenna arrays switched to by the UE based at least in part on whether the antenna blockage condition is detected.

24. The apparatus of claim 18, wherein the instructions to transmit the message that is indicative of whether the antenna blockage condition is detected are further executable by the one or more processors to cause the apparatus to:
  transmit an indication of one or more transmission configuration indicator states associated with communications between the network entity and the UE via the set of one or more antenna arrays.

25. The apparatus of claim 18, wherein the instructions to monitor for the antenna blockage condition at the UE are further executable by the one or more processors to cause the apparatus to:
  monitor for satisfaction of a proximity threshold with respect to at least one antenna array of the UE.

26. The apparatus of claim 18, wherein the antenna blockage condition is based at least in part on a proximity of a hand, a finger, or both, of a user of the UE satisfying a proximity threshold.

27. The apparatus of claim 18, wherein the plurality of predetermined sets of antenna arrays of the UE comprise a first predetermined set of antenna arrays that includes two antenna arrays that each cover portions of opposite edges of the UE and a second predetermined set of antenna arrays that includes two antenna arrays that collectively cover portions of an edge and a face of the UE via an L-shaped module.

28. An apparatus for wireless communications at a network entity, comprising:
  one or more processors; and
  one or more memories coupled to the one or more processors, the one or more memories storing instructions executable by the one or more processors to cause the apparatus to:
  receive a message indicative of whether an antenna blockage condition is detected at a user equipment (UE) that includes a plurality of antenna arrays based at least in part on the UE switching to a set of one or more antenna arrays of the plurality of antenna arrays;
  switch to a set of one or more communication parameters for communications between the UE and the network entity based on receiving the message, the set of one or more communication parameters selected from a plurality of sets of communication parameters that each correspond to communications with the UE via respective predetermined sets of antenna arrays of the UE, wherein the set of one or more communication parameters correspond to communications with the UE via the set of one or more antenna arrays switched to by the UE; and
  communicate with the UE in accordance with the set of one or more communication parameters.

29. The apparatus of claim 28, wherein the instructions to receive the message that is indicative of whether the antenna blockage condition is detected are further executable by the one or more processors to cause the apparatus to:
  receive an indication of a set of one or more antenna arrays switched to by the UE from the respective predetermined sets of antenna arrays.

30. The apparatus of claim 28, wherein the instructions to receive the message that is indicative of whether the antenna blockage condition is detected are further executable by the one or more processors to cause the apparatus to:
  receive an indication of one or more transmission configuration indicator states associated with communications between the network entity and the UE via a set of one or more antenna arrays selected by the UE from the respective predetermined sets of antenna arrays.

* * * * *